United States Patent [19]

Hardin, Sr. et al.

[11] Patent Number: 4,817,034
[45] Date of Patent: Mar. 28, 1989

[54] COMPUTERIZED HANDWRITING DUPLICATION SYSTEM

[75] Inventors: William F. Hardin, Sr., Sterling; William M. Mack, Jr., Reston, both of Va.

[73] Assignee: E.S.P. Systems, Inc., Locust Grove, Va.

[21] Appl. No.: 828,400

[22] Filed: Feb. 11, 1986

[51] Int. Cl.⁴ .............................................. G06F 3/13
[52] U.S. Cl. ...................................... 364/900; 382/2; 382/13; 340/728; 178/18
[58] Field of Search ................... 382/2, 13, 59; 178/18, 178/20; 340/712, 728; 364/200 MS File, 900 MS File

[56] References Cited

U.S. PATENT DOCUMENTS

| | | | |
|---|---|---|---|
| 2,518,694 | 8/1950 | Jannopoulo | 250/208 |
| 3,111,646 | 11/1963 | Harmon | 340/146.3 |
| 3,133,266 | 5/1964 | Fishkopf | 340/146.3 |
| 4,020,463 | 4/1977 | Himmel | 382/3 |
| 4,070,649 | 1/1978 | Wright, Jr. et al. | 382/13 |
| 4,071,690 | 1/1978 | Joannou | 178/18 |
| 4,262,281 | 4/1981 | Buckle et al. | 382/13 |
| 4,319,331 | 3/1982 | Elbaum et al. | 364/515 |
| 4,344,135 | 8/1982 | Crane et al. | 364/419 |
| 4,364,024 | 12/1982 | Paetsch | 382/3 |
| 4,440,513 | 4/1984 | Kataoka et al. | 400/165.1 |
| 4,542,412 | 9/1985 | Fuse et al. | 358/260 |
| 4,550,438 | 10/1985 | Convis et al. | 382/56 |
| 4,641,354 | 2/1987 | Fukunaga et al. | 382/13 |
| 4,653,107 | 3/1987 | Shojima et al. | 382/13 |
| 4,656,662 | 4/1987 | Filliman et al. | 382/3 |
| 4,672,677 | 6/1987 | Yamakawa | 382/13 |
| 4,679,241 | 7/1987 | Lukis | 382/13 |

*Primary Examiner*—Gary V. Harkcom
*Assistant Examiner*—Randy W. Lacasse
*Attorney, Agent, or Firm*—Larson and Taylor

[57] ABSTRACT

A computerized handwriting duplication system includes a general purpose, programmable, digital microcomputer having a buffer memory, a program memory for a computer program, and a memory for storing the digital representation of the coordinates of a signature. The system also includes a digitizer pad for providing to the microcomputer as raw data the X and Y coordinates of points travelled by a pen writing a signature thereon and for providing a keyboard-type of input information to the microcomputer. The computer program comprises routines for receiving a large string of bytes of serial raw data in absolute distances; for converting the data to relative distances beginning from a predetermined starting point and then from the previous adjacent coordinate point; for compressing the data by deleting all coordinate information generated when the cursor pen is out of contact with the digitizer pad; and for smoothing the handwriting by determining new coordinates for all points falling outside a predetermined locus. An X-Y plotter is connected to the microcomputer and is supplied with plotting commands and data points which the computer has refined from the raw data supplied to it by the digitizer pad.

9 Claims, 10 Drawing Sheets

COMPUTERIZED HANDWRITING DUPLICATION SYSTEM

FIELD OF THE INVENTION

The present invention relates to a system for duplicating handwriting, and in particular relates to a programmed, general purpose digital computer for capturing in memory a digitized handwriting sample, such as a signature, and for driving a plotter to replicate that signature.

BACKGROUND OF THE INVENTION

In today's modern society where there is a wide use of the mail system for sending substantially the same letter to a large number of different addressees, there is a need for replicating an actual signature on each letter in order to enhance the credibility of the letter. On the other hand, it would be nearly impossible for the sender of the letter to sign literally thousands of such letters. For example, heads of large organizations or companies often send letters to each of their employees or members, respectively, and like to have the personal touch of an actual signature. Similarly, members of Congress send out large numbers of letters to their constituents and if they had to sign each letter, they would spend a large part of their time doing nothing but signing the letters. Other uses would be in the advertising field by, for example, charitable organizations soliciting contributions, or companies advertising their products through the mails.

With the modern age of computers and multiple printers, a large number of individually typewritten letters can be mass produced. Such letters would largely loose their effectiveness unless they were "signed" with an authentic signature. In addition, occasionally there is the desire to handwrite a postscript to the letter below the signature. Obviously, the time requirements for such activity could be prohibitive to the sender.

This problem has been solved, to some extent, by prior art machines which are basically analog devices that "trace" a previously written signature. While these analog machines have generally proven to be satisfactory, they do have a number of drawbacks and disadvantages. For example, they tend to be extremely heavy, and thus not readily portable. Secondly, the machine is fairly limited to a simple signature and thus could not be used also to "handwrite" a message in the form of a note or postscript to a typed letter. Furthermore, these machines are fairly singular in their use, thereby requiring a relatively large capital expenditure for a singular use. Other disadvantages include the difficulty in providing, on the one hand, security and, on the other hand, easy accessibility by authorized persons and easy reproduction of any one of a plurality of signatures or handwritten messages.

SUMMARY OF THE INVENTION

The present invention provides a method and apparatus for replicating a handwritten word at a determinable location on a piece of paper. Such a word can include a person's signature as well as a handwritten note by that person. The present invention utilizes a computer connected to a means for providing a plurality of coordinate points that together represent the handwritten word. In a preferred embodiment, the computer refines the raw data received from the coordinate producing means and provides the refined data to a plotter which replicates the handwritten word at a predetermined location on a piece of paper. The refined data points are stored in a memory that is accessible by the computer, which in a preferred embodiment is a floppy disc. The computer is a general purpose, programmable computer that is controlled by a computer program according to the present invention.

Thus, the present invention provides a readily transportable computer program and data base that can be utilized on any compatible general purpose, programmable computer. In a specific embodiment of the present invention, the computer program includes a security subroutine which is used to assign a security code to each handwritten word or signature, and which, before it will drive the plotter to replicate the signature requires the correct presentation of that associated security code.

In a preferred embodiment of the invention, the handwritten word is written on a digitizer pad that produces a plurality of raw coordinates which together represent the handwritten word. The computer operating under the computer program refines the raw coordinate data by adjusting certain data points that fall outside a predetermined value so as to smooth a line connecting all the coordinates. The raw coordinate data is also compressed by the computer program by deleting coordinates that are not relevant. The raw data is further refined by translating it from absolute values to relative values. According to the method of the present invention, the coordinates are produced of a plurality of representative points which when connected by a line replicate a handwritten word. The plurality of point coordinates are stored in a memory of a digital computer. The handwritten word is replicated by providing a piece of paper to a plotter which has a writing implement associated therewith, providing the computer with the starting location on the paper of where the word is to be begun, and using the computer to provide the starting location and the plurality of point coordinates to the plotter so as to drive the plotter and the writing implement from the starting location to produce the handwritten word on the paper.

Other features, objects and advantages of the present invention are set forth in or are apparent from the detailed description set forth hereinbelow.

DETAILED DESCRIPTION OF THE PREFERRED EMBODIMENT

Figure 1:
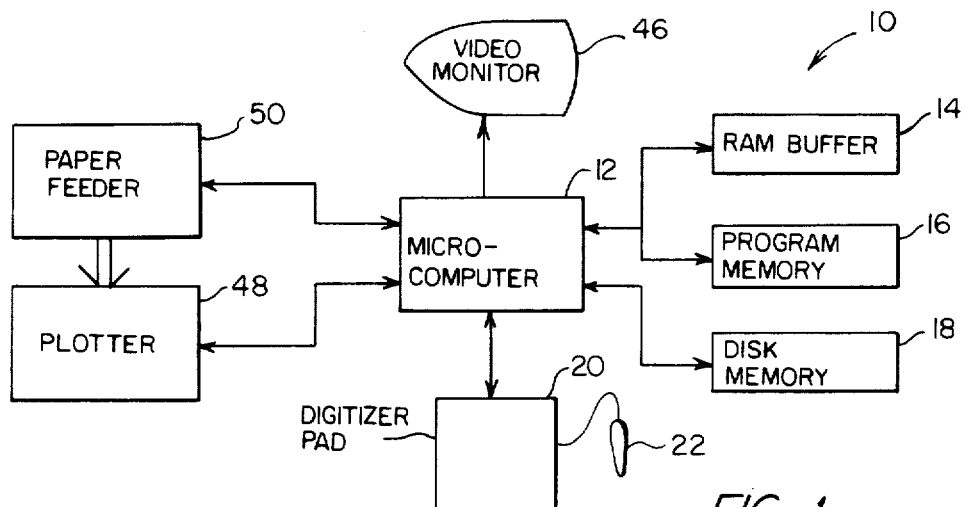
FIG. 1 is a schematic block diagram of an apparatus for duplicating a signature according to the present invention.

With reference now to the figures in which like numerals represent like elements throughout the several views, and in particular with reference to FIG. 1, a computerized hardware duplication system 10 is depicted. System 10 is based on a general, programmable digital microcomputer 12. Microcomputer 12 can be any one of a number of commercially available microcomputers, such as an IBM PC brand computer or a compatible thereto. Microcomputer 12 is bidirectionally, electrically connected to a RAM buffer 14 and a program memory 16 which can be a ROM. Alternatively, program memory 16 can be a floppy disc or hard disc, and then when the program is needed it can be transferred to the directly accessible RAM memory of microcomputer 12. Microcomputer 12 also includes off-line memory such as disc memory 18. Disc memory 18 can be either a hard disc or a floppy disc driven by appropriate mechanical drives.

Input is provided to microcomputer 12 through a digitizer pad 20 and stylus or cursor 22. An operating embodiment of the present invention used a commercially available digitizer pad manufactured by the GTCO Corporation of Rockville, Md. The signatures reproduced as FIGS. 3B and 3C were produced by GTCO digitizer pad Model DIGI-PAD 5. This digitizer pad is fully described in the DIGI-PAD User's Manual Serial Number 21A71D4, Revision E dated Feb. 29, 1984.

Figure 2:
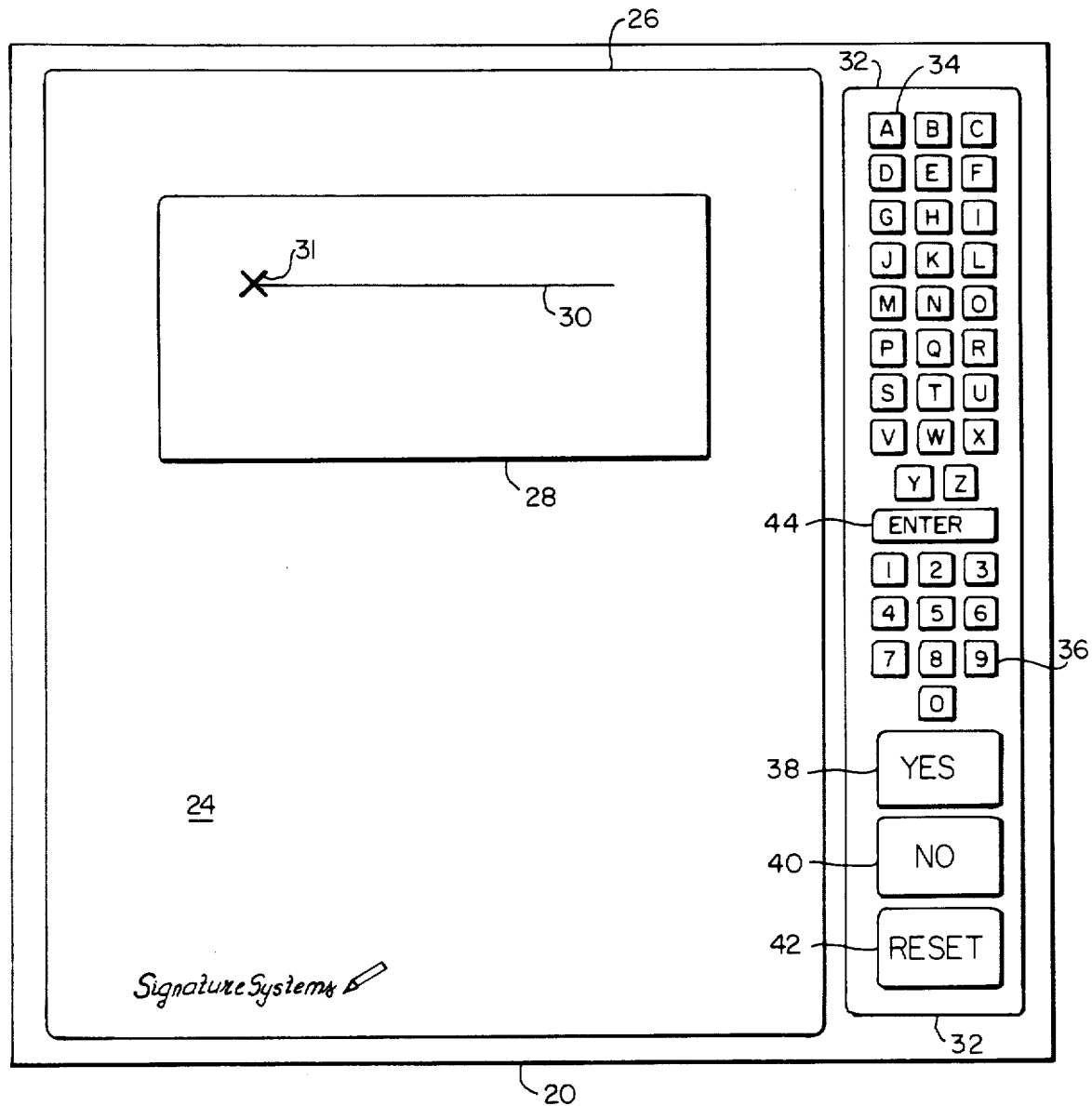
FIG. 2 is a top plan view of a digitizer pad depicting the layout of the pad for use with a computer program according to the present invention including the layout of an input keyboard.

The DIGI-PAD digitizer pad 20 operates on an electromagnetic principle based upon measuring the time for an electromagnetic signal to travel down an axis. The wave front is generated by a rapidly switched current signal in a matrix of conducting wires embedded in a rigid tablet. The electromagnetic wave is used to produce an absolute coordinate system of information. The DIGI-PAD system also includes a stylus or cursor having an inductance coil which is operable at high signal switching levels. The DIGI-PAD digitizer pad utilizes a complex signal that is induced in the cursor coil by an electromagnetic field created by the sequentially pulsed current applied to consecutive tablet matrix wires. This system provides a means for measuring the cursor position relative to an aribitrary reference point or orgin on the tablet (which for Digi-Pad 5 is located in the lower left hand corner as seen in FIG. 2) as a result of the linear relationship between the distance and time the current signal arrives as sensed by the cursor coil. The electronics provided with the digitizer pad, which is disclosed in greater detail in the aforementioned user's manual, utilizes a precision clock source set to a digital counter at the moment the electromagnetic signal passes the tablet reference point. The count in the clock is frozen when the detection circuitry connected to the cursor coil senses the phase reversal that occurs when the current signal sweeps past. The contents of the counter then contains a number that is precisely related to the cursor position on the cursor pad. The digitizer pad also contains a Cartesian X-Y scanning system to determine the horizontal and vertical positions.

The DIGI-PAD digitizer pad also produces two positive signals that are indicative of the relative location of cursor 22 with respect to the surface of pad 20. The pad produces a "one" together with location information when cursor 22 is in contact with digitizer pad 20 and produces a "zero" together with location information when cursor 22 is located proximate to the surface of digitizer pad, but not in contact therewith. In a preferred embodiment of the present invention, the contact indication is provided by a switch located in cursor 22, which switch is activated by pressing cursor 22 against the surface of digitizer pad 20. A third type of indication is also possible from digitizer pad 20 when cursor 22 is not located proximate to the surface of digitizer pad 20. This indication is simply the transmission of no location information. If microcomputer 12 were receiving information from digitizer pad 20 starting at a timed pulse and no information were received until a known time interval later, then this lack of received information would be indicative of cursor 22 being not proximate to the surface of digitizer pad 20. For the DIGI-PAD 5 digitizer pad, the proximate lock height is one inch. Such a pad has a maximum scan rate of 200 X and Y points per second with a resolution and repeatability of 0.001 inches.

Figure 3A:
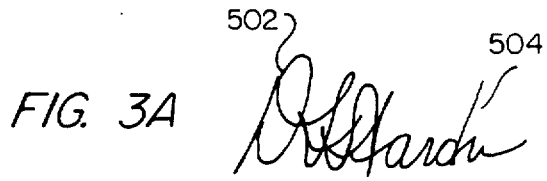
FIGS. 3A, 3B and 3C are photoduplications of three signatures, FIG. 3A being a duplication of the actual signature as written by D. L. Hardin, FIG. 3B being a replication of the signature of FIG. 3A by an embodiment of the present invention in which the greatest amount of smoothing was utilized, and Fig. 3C being a replication of the signature of FIG. 3A in which there has been no smoothing.
Figure 3B:

To "write" the signatures in FIGS. 3B and C, the Digi-Pad 5 digitizer pad was configured to provide 200 coordinate pairs of continuous information per second at a Baud rate of 9600 with parity disabled and using an eight bit character in the serial Input/Output RS232 mode. It was also configured to include a pushbutton code with space and carriage return, but no line feed, with a five digit ASCII, high resolution packed binary character of inch data being transmitted.

With reference to FIG. 2, the top surface of digitizer pad 20 is depicted. Digitizer pad 20 is utilized not only for recording a signature or other written note, but also for providing input commands to microcomputer 12. Digitizer pad 20 includes a paper location area 24 outlined by a perimeter border 26. Area 24 in the presently preferred embodiment is 8½ inches by 11 inches so that a standard sheet of paper can be accurately located. Located inside border 26 is a signature rectangle 28 having a signature line 30, the beginning of which is marked with an "X" 31. By defining the location for placing the signature, a more simplified computer program, described below and disclosed in the microfiche appendix, can be used with digitizer pad 20, to accurately locate the signature when it is being recorded and to cause it to be accurately reproduced at a different, and usually lower, location on paper. This simplification results from the use of a constant offset from "X" 31 to a point that is indicated in area 24 by an operator using cursor 22, as described in greater detail hereinbelow.

Digitizer pad 20 also has a keyboard area 32 which contains three types of indicia: alphabet, numbers, and commands. The alphabet indicia are located in the upper portion of keyboard area 22 and each letter of the alphabet is located in its own square, such as alphabet square 34 for the letter "A". The numbers of keyboard area 32 are located in a midportion thereof with each number being in its own numerical square, such as numerical square 36 for the number "9". Keyboard 32 is also provided with four commands, three of which are located in the lower portion thereof. These are the "yes" command box 38, the "no" command box 40 and the "reset" command box 42. However, for ease of use, a forth command box 44 for the command "enter" is located between alphabet squares 34 and numerical squares 36.

Althought the operation of keyboard area 32 is described in greater detail hereinbelow, for ease of understanding the present invention the use of keyboard area 32 will be described now. As mentioned above, when cursor 22 is placed anywhere within the active area of pad 20 and in proximity to the surface thereof, the coordinates of the location of the tip of cursor 22 is provided by the counter of the electronics of pad 20 when cursor 22 senses the travelling current pulses. Thus, it should be obvious to those skilled in the art that, for example, the letter "A" can be provided to the computer simply by placing cursor 22 over the area defined by "A" and then using software to decode the received position information of cursor 22 with the known position of the "A" square 34.

Returning to FIG. 1, computerized handwriting duplication system 10 further comprises two output devices, a video monitor 46 and an X-Y plotter 48. Video monitor 46 is a standard, commercially available video monitor together with a video board located in microcomputer 12. In the present embodiment of the invention, video monitor can simply be an alphanumeric monitor and need not be a color or graphics quality monitor.

Plotter 48 is a conventional, commercially available X-Y plotter, such as Model 595 manufactured by Houston Instrument, Inc. of Austin, Tex., and described in their publication entitled "PC Series Digital Plotter Operation Manual" No. MI-1050 (1984). For the purpose of describing the presently preferred embodiment of the present invention, the Houston Instruments plotter will be described. This plotter is a small, rugged plotter designed for use with personal computers, such as the IBM PC computer. The plotter uses the Houston Instrument Digital Microprocessor Plotting Language (DM/PL) for operation with the microcomputer. Such plotter is a tabletop unit with all electronic circuitry provided. The plots can be produced on standard sized paper (8½ by 11 inches) by moving the plotting paper vertically in and out and moving the drawing pen transversely back and forth to produce the desired plot. The plotter receives its operating instructions from the microcomputer using standard RS-232C signals. The Model 595 plotter also has a provision for using and selecting one of four different pens. This is done by mounting the four pens on a rotatable housing that can be controlled by the host computer. The plotter has a buffer of 256 bites and utilizes 7 data bits with a selectable one parity bit and two stop bits. The model 595 plotter used to replicate signatures in FIGS. 3B and C was configured with a 9600 baud rate for data with no parity and bit number 8 to set to a 1. In performance, it has a maximum speed of 3 inches per second in the axial direction and 4.2 inches per second in the diagonal direction, and has an addressable resolution of 0.001 inches, 0.005 inches, 0.1 mm, or 0.025 mm. The plotter has grit wheels and pinch wheels for grasping the paper while plotting. The grit wheels have small particles on their periphery which make small indentations in the paper, thereby preventing slippage while plotting. The plotter can be manually fed, one sheet at a time, or can be coupled to a paper feeder.

In the embodiment depicted in FIG. 1, plotter 48 is coupled to an automatic paper feeder physically mounted on top of plotter 48 and feeds one sheet of paper at a time. Paper feeder 50 receives software commands from microcomputer 12 and provides status signals back to microcomputer 12. Similarly, plotter 48 receives its programming commands and data commands from microcomputer 12 and returns status commands to microcomputer 12.

With reference now to FIGS. 4 through 12, and also to the appendix, the computer program which operates system 10 will now be described. Initially, it is noted that the computer program is written in Microsoft basic to be run under the MSDOS operating system. With respect to FIG. 4, a main menu selection routine 80 is depicted. When the computer is powered up, an autoexec.bat program (not shown) in the DOS operating system causes computer 12 to load main menu routine 80 into program memory 16. The main program begins in process box 82 where an introductory message is displayed on video monitor 46 (see Appendix, beginning at line 240). The screen of video monitor 46 is then blanked and a message of "Good morning, afternoon or evening", as the case may be, is displayed together with the message "Do you want to use a previously recorded signature?; (yes/no)". The program then proceeds to decision box 100 while the program awaits an answer from the operator.

The operation of the choice selection and entry will now be described. As soon as an entry is made by touching cursor 22 to the appropriate command box 38, 40 or 42 (FIG. 2). The program branches to subroutine 5200 (see program listing) where the keyboard entry is denoted "CHOICE$" and the program calls subroutine at line 12470 of the program listing. This subroutine returns the selected key pad item and first initializes the possible variables. When the digitizer pad 20 is touched, an interrupt is sent to the program and the program branches to a third nested subroutine at program line 12400 (because the GTCO digitizer pad is being used). At this subroutine, the point touched on digitizer pad 20 is called XY$ by the statement:

XY$=input$(13,#1).

The program then converts data to inches with the command:

XD=0.001*VAL(MID$)XY$,2,5)): YD=0.001*VAL(MID$)XY$,8,5)).

The program executes a coordinate transform to convert the absolute value received to the overlay orientation as depicted in FIG. 2. For the present example, this is simply the program line:

X=11−YD: Y=XD.

The point touched on the digitizer pad has now been converted to inches and transformed to the proper X-Y coordinate system. The program checks beginning with program line 12500 whether the point coordinates that have been provided by cursor 22 touching digitizer pad 20 are within the limits of the key pad area. Depending upon which one of a series of IF THEN tests are true, the appropriate subroutine is called. Since presumably a command box has been touched, the program will branch to program line 12710 where the program converts the entered point into a position within the appropriate function area and where entries falling near the boundary lines are eliminated. The program lines for making these calculations are as follows:

YC=Y/1.5-INT(Y/1.5): XC=X=0.5-INT(X=0.5)
IF YC<0.04 or YC>0.96 OR XC<0.05 OR XC>0.95 THEN RETURN FUNC=CINT(X-7)
IF FUNC=1 THEN CHOICE$="YES": GOTO 12810
IF FUNC=2 THEN CHOICE$="NO"; GOTO 12810
IF FUNC=3 THEN CHOICE$="RESET": GOTO 12810

The first two lines check that the point is not within 0.05 inches of the line. The next line rounds the input point to an integer and then substracts 7 from it and the remainder will either be a 1, representing the choice of "yes", a 2 representing the choice of "no" or a 3 representing the choice of "reset". The function has now been selected and it is printed on the screen of monitor 46 and the program responds appropriately.

Figure 4:
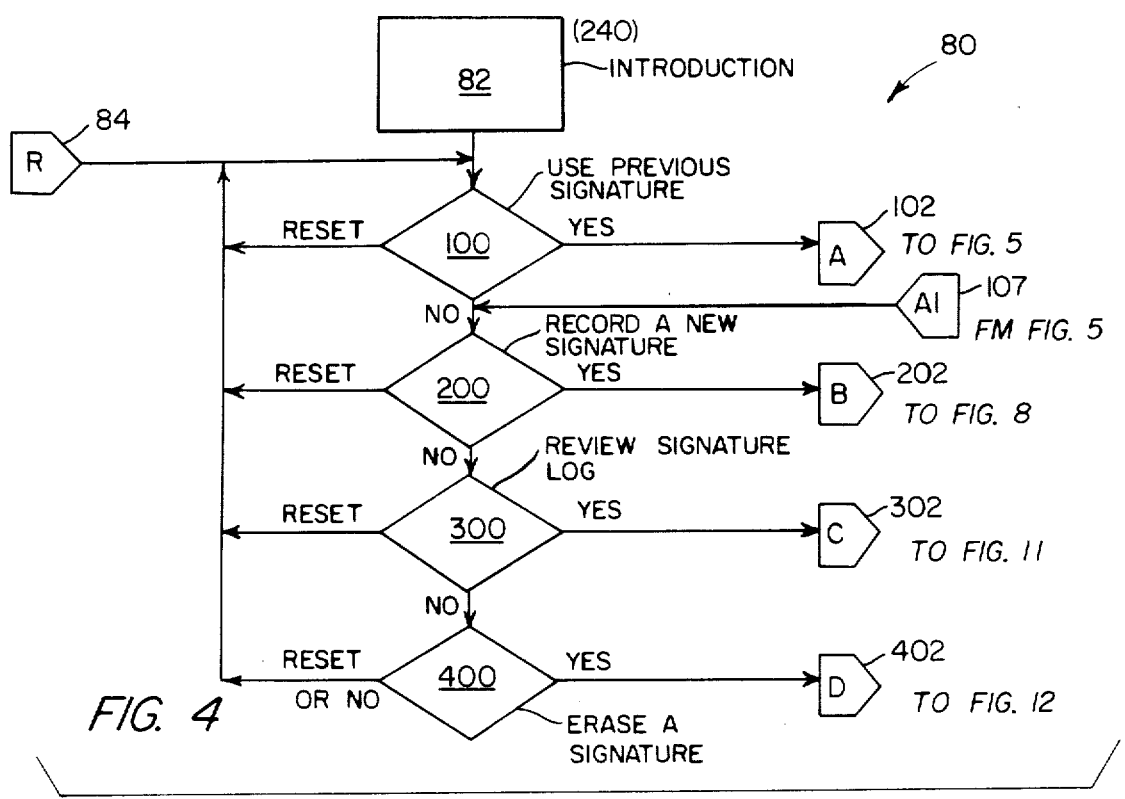
FIG. 4 is a schematic flow chart of the main menu of a computer program according to the present invention.
Figure 5:
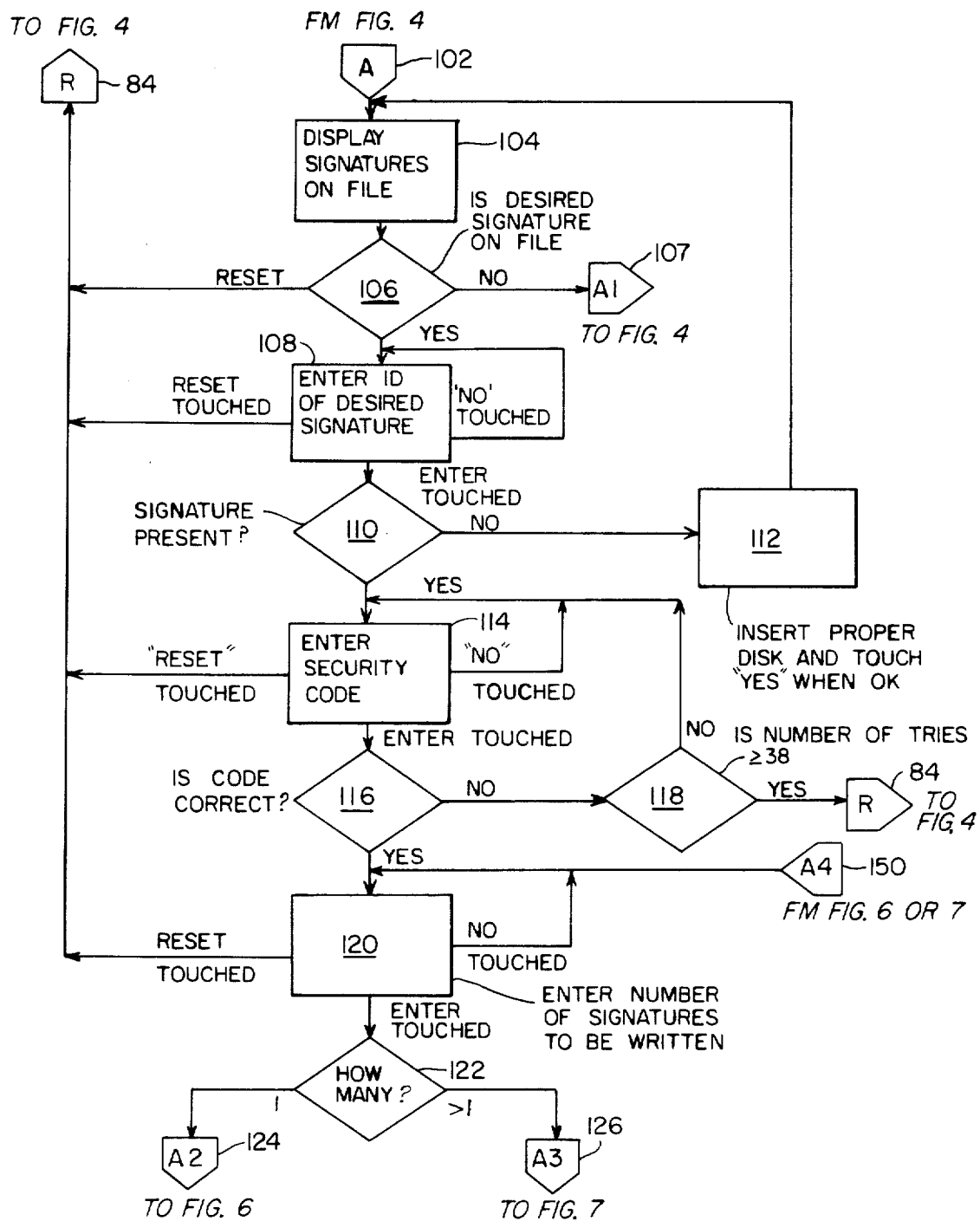
FIGS. 5, 6 and 7 are a schematic flow chart of the program routine used to replicate a signature.

Hence, referring again to FIG. 4, if the yes selection is touched by the operator, as shown in decision box 100 the program branches through an off page connector 102 to FIG. 5. If the no selection is touched, the program proceeds to a decision box 200. Finally, if the reset command box 42 is touched, the program branches back to the top of decision box 100.

Assuming that the operator selected the "yes" option to the question of whether a previous signature is to be used, the program branches to the "USE" routine and enters process box 104. In process box 104, the program displays all of the signatures which are presently stored on the floppy disc in the default disc drive of microprocessor 12, indicated as disc memory 18. In decision box 106, the program ascertains from the operator whether the desired signature is on the file. At this point, the operator can select reset, in which case the program branches through off page connector 84 back to the main menu routine 80 of FIG. 4. If the operator positions cursor 22 on NO command box 40, the program branches through off page connector 107 back to FIG. 4 and into decision diamond 200 where the main menu asks whether the operator wishes to record a new signature. Assuming that the operator selects the "YES" command box 38 with cursor 22, the program then enters process box 108 where the program causes the screen of video monitor 46 to display a request for the entry of the identification of the desired signature. The signature file identification is provided by the operator touching the appropriate alphabet square 34 or numerical square 36. On the other hand, the operator can also select reset command box 42 in which case the program immediately branches back to FIG. 4 through off page connector 84, or can select the "NO" command box 40 in which case the program branches back to the top of process box 108. When the operator selects the appropriate alphanumeric square, the program uses a similar locating subroutine as described above with respect to the command boxes 38, 40 and 42.

To summarize, the program first makes an in-bounds check and then uses a similar mathematical algorithm to check for the particular alphanumeric square that has been touched. Once the selection has been decoded, the selection is displayed on video monitor 46. The program waits until another alphanumeric box is selected, thereby repeating the foregoing process, or until the enter command box 44 is selected. Once the enter command box 44 is selected, the program continues to decision box 110 where the program checks whether the requested signature is present. If the requested signature is not present, the program branches to process box 112 where the program causes video monitor 46 to display the message "insert proper disc and touch 'yes' when okay", and then branches back to the top of process box 104.

If the signature is present and the operator enters the response "yes" by touching cursor 22 to command box 38, the program will continue to process box 114. In process box 114 the program requests the entry of the security code corresponding to the signature identification. However, the operator can also select the "reset" command box, whereupon the program branches back through off page connector 84 to FIG. 4. As with the selection of the signature identification, the operator, if an error is made, can restart the security code by touching "NO" command box 40. Also as with the entry of the signature identification, the selection of the appropriate alphanumeric square will result in the selection being displayed on video monitor 46. The process will continue until the "enter" command box 44 is touched.

When the enter command box 44 is touched, the program will branch to decision box 116 whereupon the program will check the security code. If the code is incorrect, the program will index a counter so that no more than three tries or guesses at the security code can be attempted. The program does this in decision box 118 and if the number of tries is greater than or equal to three, the program branches back to FIG. 4 through off page connector 84. If the number of tries is less than three, the program branches back to the top of process box 114 where the operator is again asked to enter the security code. Assuming the security code is correct, the program continues to process box 120 where the programs asks the number of signatures which the operator wishes to have written. Again, the operator is given the opportunity to change his or her mind by selecting the "no" command box 40, in which case the program branches back to the top of process box 120. Alternatively, the operator can touch the "reset" command box 42 whereupon the program branches back to FIG. 4 through off page connector 84.

As described above, the program will decode the selected number depending upon which numerical square 36 cursor 22 touches. If the wrong square is touched, (e.g. alphabet square 34) the program indicates an error and again asks for the number of signatures to be written. The selected numbers are displayed on video monitor 46 and the program continues as soon as the "enter" command box 44 is touched. The program then determines in decision box 122 whether one or greater than one signatures have been selected and the program branches respectively through off page connector 124 and 126 to the appropriate routine depicted in FIG. 6 or FIG. 7.

Figure 6:
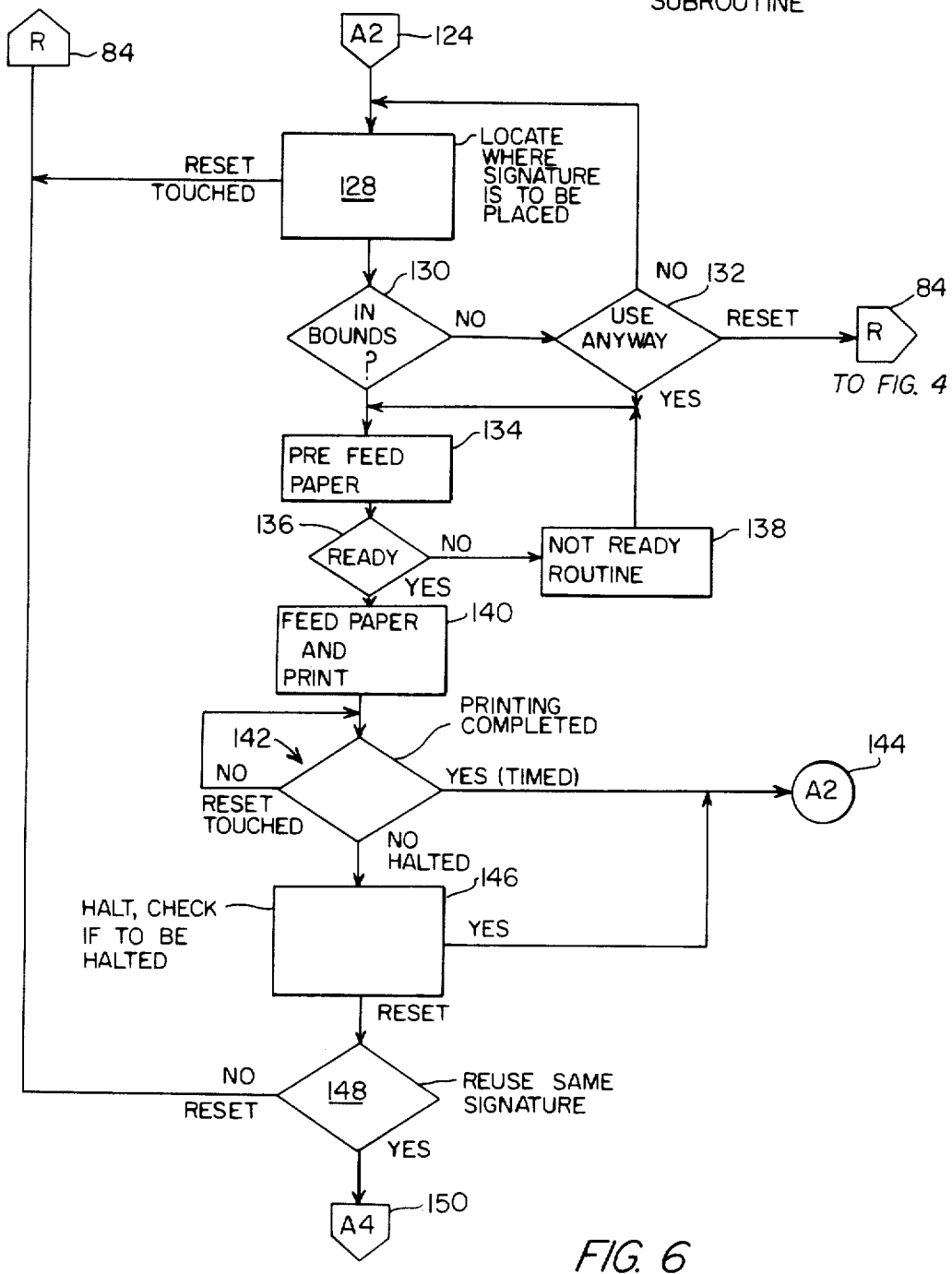

If the operator selects just one signature to be replicated, then the program continues through off page connector 124 to FIG. 6 where the software in process box 128 asks the operator to place the cursor 22 on digitizer pad 20 at the location where the signature is to be replicated. The operator is also given the choice to touch "reset," whereupon the program branches through off page connector 84 to the main menu depicted in FIG. 4. As soon as the operator touches digitizer pad 20 with cursor 22, the program calculates where the signature is to be placed and then enters decision box 130 where a determination is made whether the entire signature will be within the boundary capabilities of plotter 48 (FIG. 1). If the program calculates that the signature will not be within proper bounds, then the program branches to decision box 132 where the operator is asked whether the signature should be used anyways. If the operator touches the "reset" command box 42, the program branches back to the main menu through off page connctor 84. Alternatively, if the operator selects "no" command box 40, then the program branches back to the top of process box 128 where the procedure is repeated. If the program determines in decision box 130 that the signature is within the boundary limits, or if the operator indicates to use the signature anyway, the program proceeds to process box 134 where paper feeder 50 is commanded to feed a sheet of paper to plotter 48. The program then proceeds to decision box 136 where the program determines whether there is a print ready command from the plotter 48. Typically, plotter 48 provides such a command by using a hardwired handshanking signal connected to microcomputer 12 as an input signal.

If the program determines in decision box 136 that plotter 48 is not ready, the program branches to process box 138 where the program runs the "not ready" routine. This routine notifies the operator by displaying a message on video monitor 46 that the plotter is not ready and that the operator should attend to the error condition. The program then branches back to the top of process box 134 where the program waits until it receives an indication that the paper has been properly fed. If the program determines in decision box 136 that plotter 48 is ready, the program proceeds to process box 140 where the program instructs plotter 48 to feed the paper and commence printing the signature at the location indicated by the operator in process box 128. It is noted that the paper which is fed is usually a typed letter that simply needs a signature or handwritten postscript before it can be sent.

The program proceeds from process box 140 into a timing loop 142 whereupon if no interruption is indicated the program branches back to the top of process box 128 through on page connector 144. On the other hand, while the signature is being printed, video monitor 46 displays a message instructing the operator that the process can be halted by touching "reset" command box 42. Should the operator thus respond, the program is interrupted and proceeds to process box 146 where the program halts and displays a message to the operator on video monitor 46 to indicate by touching "reset" command box 44 if the operation is to be terminated or the "yes" command box 38 if the single signature mode is to be rerun. If the operator touches the "yes" command box 38, the program branches through on page connector 144 back to process box 128. On the other hand, if the operator touches "reset" command box 42, the program branches to decision box 148 where the operator is asked whether the same signature is to be reused. If the operator touches "reset" command box 42, the program branches through off page connector 84 back to the main menu routine of FIG. 4. On the other hand, if the operator touches the yes command box 38, then the program branches back through off page connector 150 to the use routine depicted in FIG. 5 at the top of process box 120, where the operator is again asked to enter the number of signatures to be written.

Figure 7:
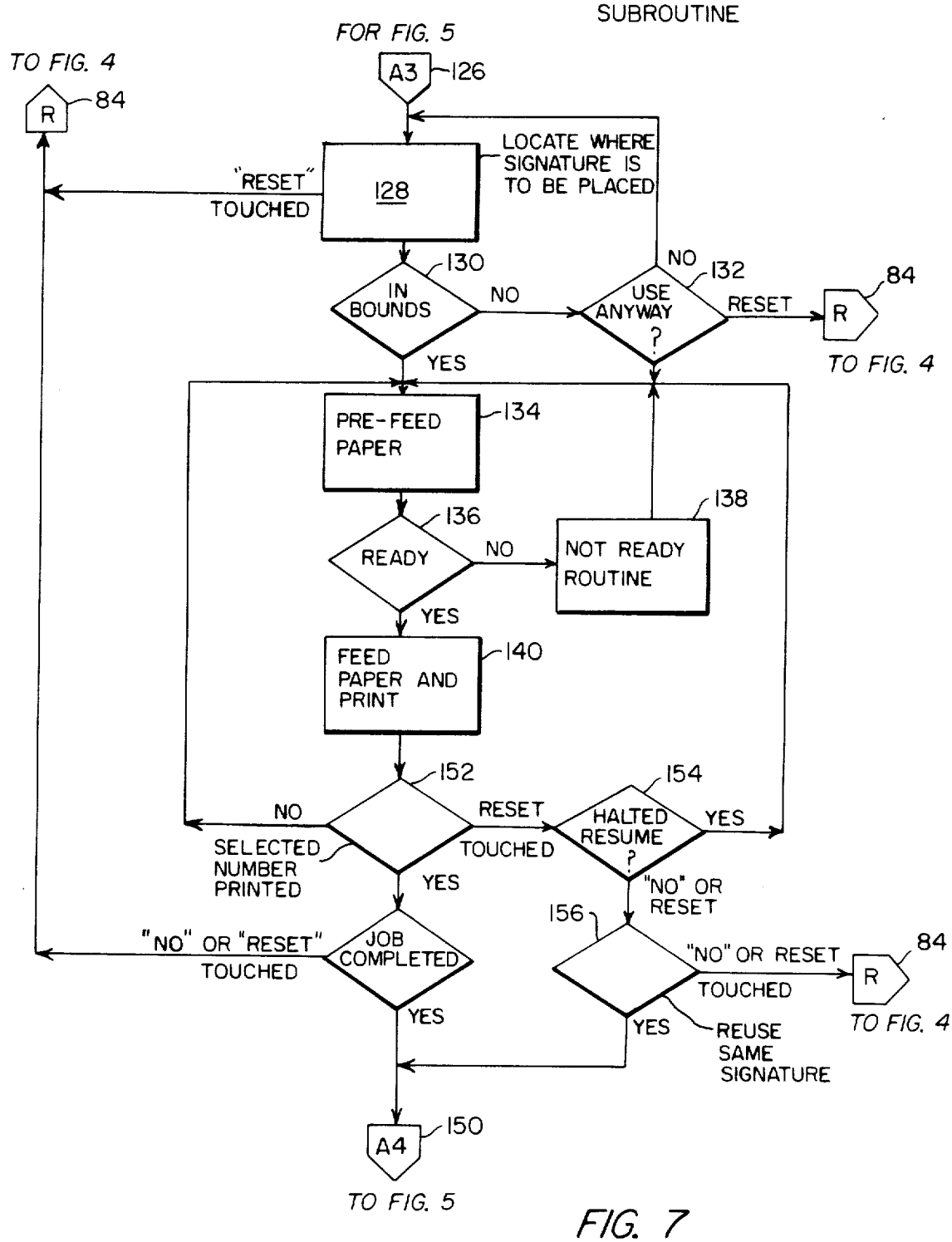

If in decision box 122, FIG. 5, the program determines that the operator has requested more than one signature, then the program branches through off page connector 126 to FIG. 7. The program proceeds through the same initial steps beginning with process box 128 and continuing through process box 140 as described above with respect to FIG. 6 for a single signature replication. However, from process box 140, as shown in FIG. 7, the program proceeds to decision box 152 where the computer keeps track of the number of signatures that have been printed. If the number of signatures which has been completed is not equal to the number indicated by the operator in decision box 122, FIG. 5, the program branches back to the top of process box 134. As the program controls plotter 48 to write the signatures on a plurality of sheets, the operator is kept apprised of the progress by the message "Printing #__ of __; touch reset to terminal" being displayed on video monitor 46. Thus, the program indicates not only the number of pages to be printed, but also the current page which is being printed. As in the subroutine for the single signature replication, the operator can terminate the job at any time simply by touching reset command box 42 with cursor 22. The program poles digitizer pad 20 upon completion of each signed sheet. If it detects that the reset command box has been touched, the program branches to decision box 154 where the following message is indicated:

job temrinated at number __ of __
touch yes to resume current signature
touch reset to start another job.

Thus, if the operator touches yes command box 38, the program branches back to the top of process box 134. If either the no or reset command boxes 40 or 42 are touched, the program branches to decision box 156 where the program asks the operator to indicate whether the current signature should be reused or whether another job is to be started. If the operator touches reset command box 42, the program branches through off page connector 84 back to the main menu in FIG. 4. On the other hand, if the operator indicates that the current signature is to be reused, the program branches back through off page connector 150 to the top of process box 120 in FIG. 5.

Returning again to FIG. 4, as mentioned above, the program asks the operator in decision box 200 whether a new signature is to be recorded. If that is the case, a program branches through off page connector 202 to FIG. 8 where the program enters the signature recording routine, and in particular a capture subroutine 204, which is depicted in FIG. 8A.

Subroutine 204 begins in process box 206 where the program first initializes digitizer pad 20, sets up ram buffer 14, and prepares the system to commence accepting a large number of data points at the rate of 200 points per second. Then, the program gives the operator a start tone and begins to receive data. As mentioned above, the computer will receive data from the digitizer from the commencement of the start tone. If cursor 22 is not located proximate to the surface of digitizer pad 20 (about an inch above the top thereof), then no data will be sent to the computer and effectively only zeros will be stored. When cursor 22 is located proximate to digitizer pad 20, but is not pressing on the pad, digitizer pad 20 will give a "pen down" signal. When cursor 22 is pressing down on digitizer pad 20, a switch is thrown therein and a "pen down" signal is produced by digitizer pad 20. Thus, from process box 206 the program proceeds to a decision box 208 where the program awaits the receipt of a "pen up" or a "pen down" signal.

If neither signals are present, the program will branch to process box 210 and will load a zero in buffer 14. After a time delay (of about 0.005 second), the program branches back to the top of decision box 208. As soon as digitizer pad 20 indicates that cursor 22 is proximate thereto, the program determines in decision box 208 whether a "pen up" or a "pen down" signal has been received. If a "pen up" signal has been received, the program in process box 212 prefaces the X-Y coordinate received from digitizer pad 20 with a zero, then in process box 214 stores the number in buffer memory 14. The program then proceeds to decision box 216 where the program again determines whether cursor 22 is not proximate to digitizer pad 20. As long as cursor 22 is proximate to but not touching digitizer pad 20, the program continues to loop to the top of decision box 208. When the program receives a "pen down" signal, it branches to a process box 216 where it prefaces the X-Y coordinate received from digitizer pad 20 with a "1". The program then proceeds as described above by storing the received number in buffer memory 14, and determining whether cursor 22 is not proximate to digitizer pad 20 in decision box 216.

Thus, it can be seen that in the process of a person signing his or her signature, initially a number of zeros will preceed the raw data received from digitizer pad 20. Then, a number of coordinates preceeded by a "0" will be stored, and finally, a number of coordinates preceeded by a "1" will be stored. As the signature is being written, the pen may be lifted from the surface of digitizer pad 20, such as to begin a new word or to dot an "i." At that time, cursor 22 still remains proximate to digitizer pad 20, but the pen down signal is no longer received. Therefore, the digitizer pad still produces an X-Y coordinate, but the program through decision box 208 in process box 212 will preceed the coordinates with a "0." As soon as cursor 22 is again placed into contact with digitizer pad 20, the pen down signal will be received and the coordinates will be preceded by a "1." When the signer is done with the signature or other handwritten message, cursor 22 is lifted away from being proximate to digitizer pad 20 and the program determines in decision box 216 that the cursor is no longer proximate to the surface of digitizer pad 20. At this point, the program returns through terminal 217 to the record routine depicted in FIG. 8.

An example of such raw data is depicted in appendix 1. This data represents the signature written in FIG. 3a.

Figure 8:
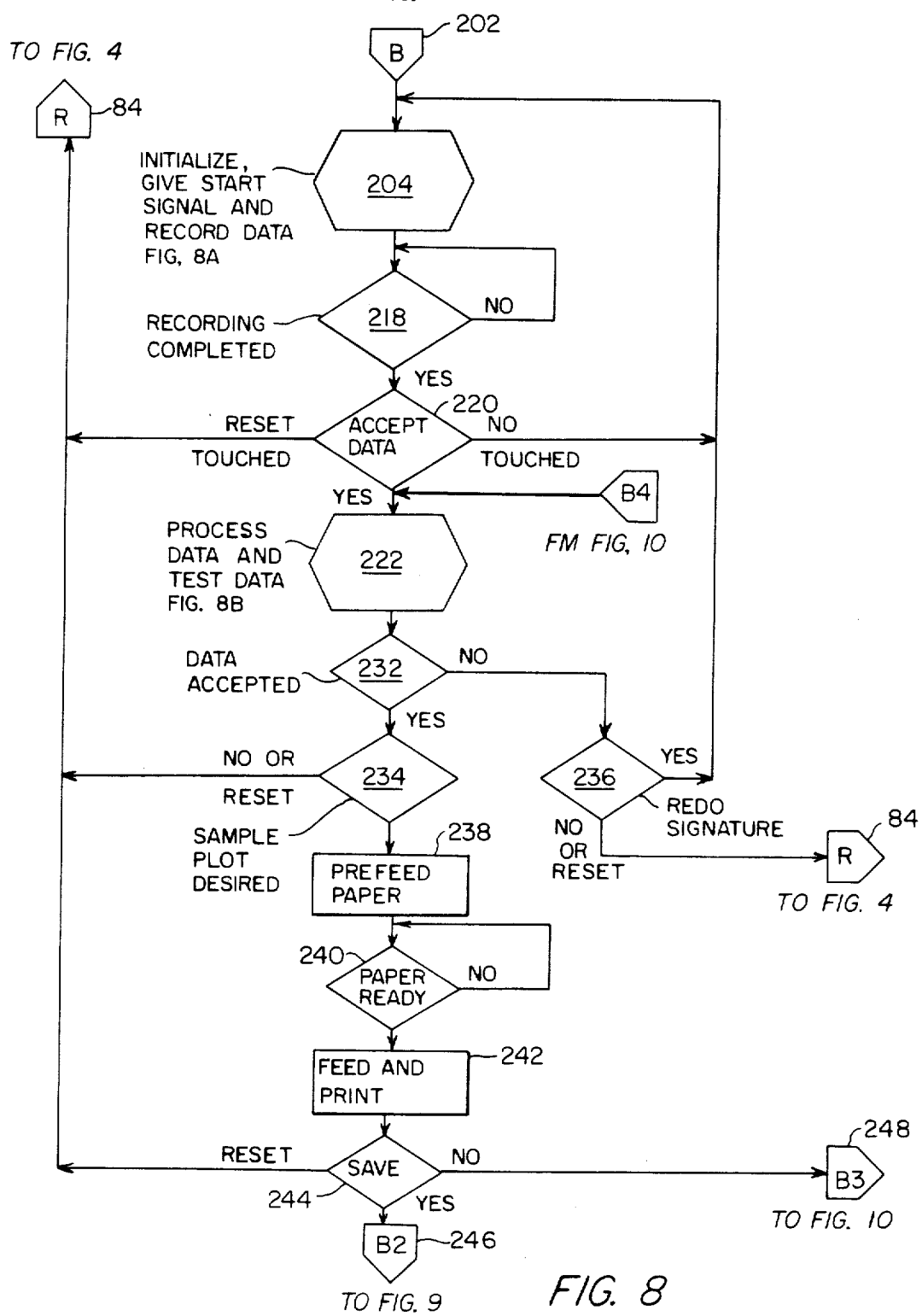
FIGS. 8, 8A and 8B, collectively.
Figure 8A:
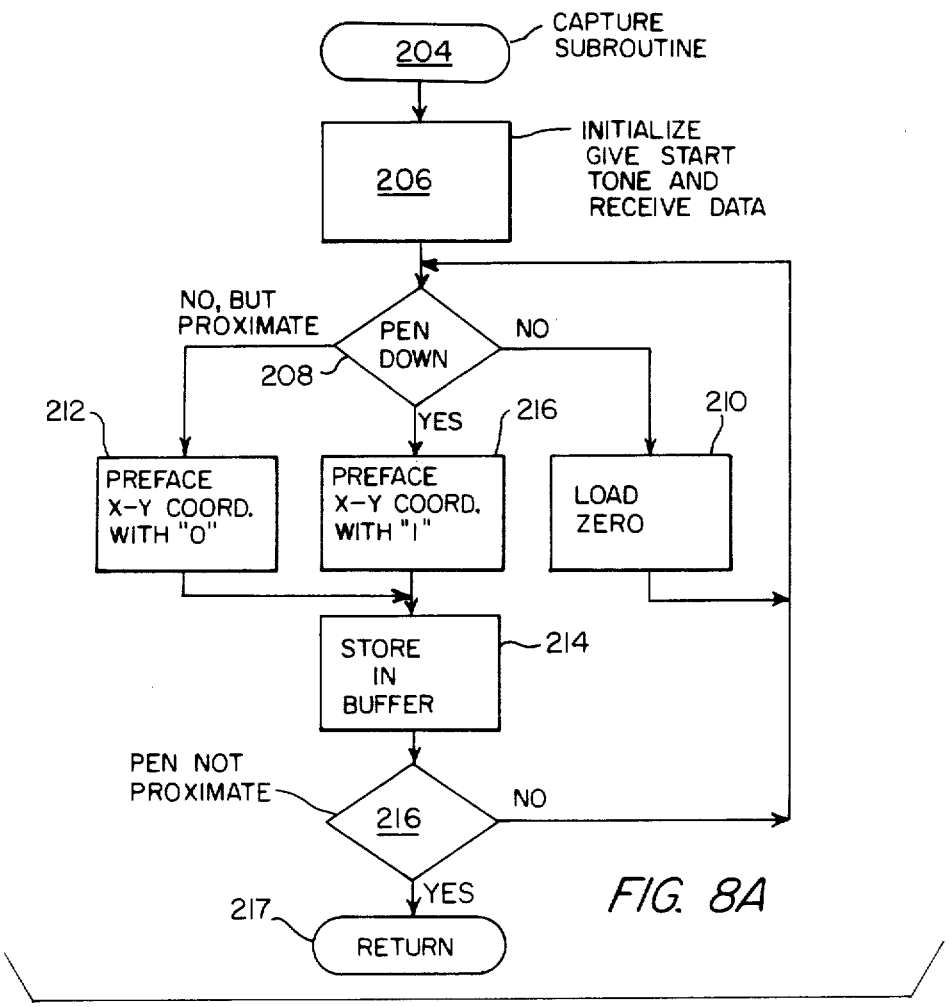
Figure 8B:
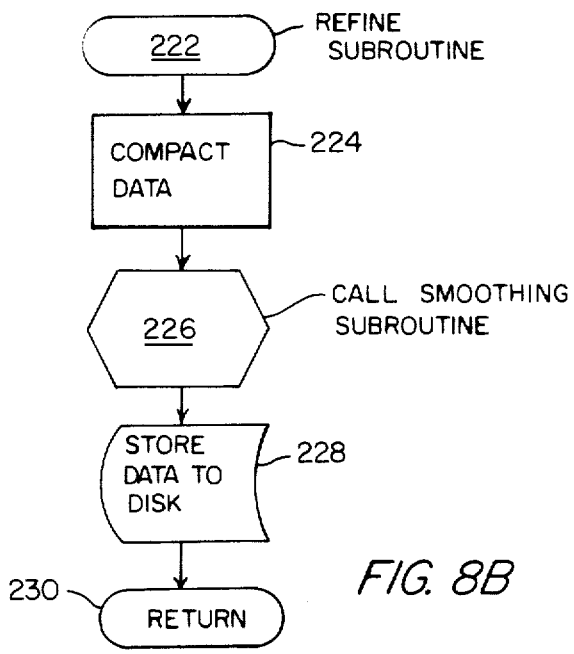

When the program returns to the record routine in Fig. 8, it enters a decision box 218 to determine whether the recording is complete. When the recording is complete, the program branches to decision box 220 where the program determines whether to accept the data or not. Basically, the program simply checks all of the data received to make sure that it is in the correct format. The expected format is blocks of 12 digits where the first digit of the block is a zero or one, the next five digits are the absolute position in ten thousandths of an inch in the X direction, then a space, then five digits to indicate in tens of thousandths of an inch the absolute position in the Y direction. If the data is unacceptable, the program provides that message on video monitor 46 that the operator should either touch reset command box 42 or the no command box 40 depending upon whether the operator desires to return to the main menu depicted in FIG. 4 or whether the operator wishes to try again and record another signature. If the data was received in the correct format and is acceptable to the program, the program proceeds to subroutine box 222 where the program processes the data and tests the data further. The refine subroutine is depicted in greater detail in FIG. 8b. First, the subroutine proceeds to process box 224 where the program compacts the data by deleting all coordinates that have a leading zero. Then the subroutine calls a nested subroutine in subroutine box 226 for smoothing the compacted data. The smoothing subroutine is described in greater detail hereinbelow with respect to FIG. 3. Smoothing subroutine 226 also changes the data from absolute to relative and further inserts the computer commands necessary to operate plotter 48. From subroutine box 226, the program stores the refined data to disc in storage box 228. An example of refined data obtained from the raw data listed in appendix 1 is shown in appendix 2, and is explained in greater detail hereinbelow. From storage box 228, the program proceeds to terminal 230 where the program returns to the main subroutine depicted in FIG. 8 and enters decision box 232.

The program in decision box 232 asks the operator whether the signature should be accepted or not. If the operator touches the yes command box 38, the program proceeds to decision box 234 where the program asks the operator whether the operator desires a sample plot or not. If the data is not acceptable, the program branches to decision box 236 where the program asks the operator whether the signature is to be redone. If the operator indicates yes, then the program branches back to the top of subroutine box 204. If the operator touches no or reset command boxes 40 or 42, the program branches back through off page connector 84 to the main menu routine of FIG. 4. If when the program is in decision box 234, the operator indicates that no sample plot is desired, the program also branches back to the main menu routine of FIG. 4 through off page connector 84.

If the operator responds that a sample plot is desired, the program then proceeds through a series of steps similar to steps in process boxes 134 through 140 of FIG. 6. Therefore, from decision box 234, the program proceeds to process box 238 where the paper is prefed from paper feeder 50 to plotter 48 (FIG. 1), the program waits in decision box 240 until the paper is ready, and then in process box 242 the program commands plotter 48 to feed and print the paper. From process box 242 the program proceeds to a decision box 244 where the operator is asked whether the sample signature is to be saved or not. The operator has three choices. If the operator touches reset command box 42, the program returns to the main menu routine of FIG. 4 through offpage connector 84. If the operator touches the yes command box 38, the program branches through off page connector 246 to a continuation of the recording routine depicted in FIG. 9. If the operator touches the no command box 40, the program branches through off page connector 248 to a reprocess subroutine depicted in FIG. 10.

Figure 9:
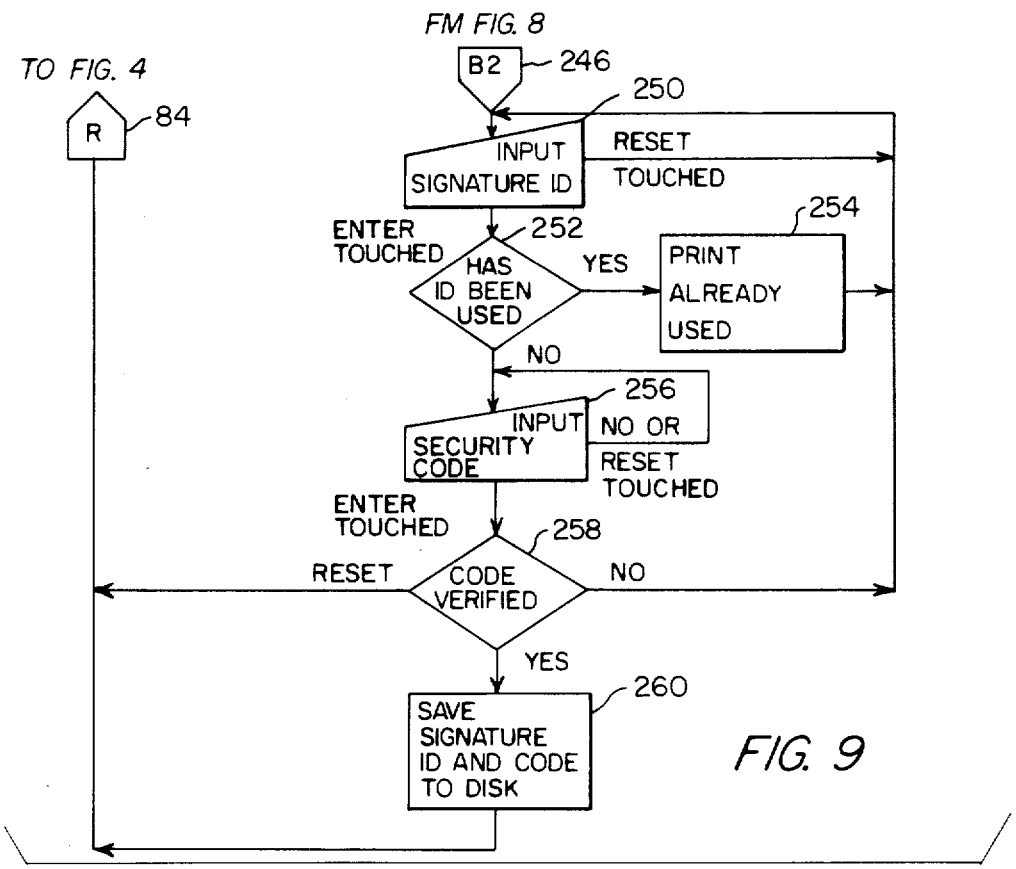
FIGS. 9 and 10 are schematic flow charts of the signature recording program routine.

Continuing the recording routine in FIG. 9, the program enters input box 250 where the operator is asked to supply the identification for the desired signature. The operator can supply a signature identification of either letters or numbers by touching the appropriate alphanumeric squares 34 or 36 on digitizer pad 20. These letters and numbers are decoded as described hereinabove. Alternatively, the operator can touch reset command box 42 if a particular signature identification is not wanted and the program branches back to the top of input box 250. As the operator selects each letter or number, it is displayed on video monitor 46. When the operator is satisfied with the signature identification, the operator touches the enter command box 42 and the program proceeds to decision box 252. In decision box 252, the program determines whether the identification has been previously used. If the identification has been previously used, the program branches to process box 254 where the message "Identification already used" is printed on video monitor 46. From process box 254, the program branches back to the top of input box 250. If the identification has not been previously used, then the program proceeds to input box 256 where the operator is asked to supply a security code. As with the signature identification, the operator can touch the no or reset command boxes 40 or 42 to reject a selected entry and the program will return to the top of input box 256. When the operator is satisfied with the selected security code, the enter command box 44 is touched and the program proceeds to decision box 458 where the program verifies whether the selected security code is proper or not by checking to see if it contains only acceptable values and is of the correct length, and by asking the operator to enter the security code and then comparing this later entered code with the first selected code. If the code is not proper, the operator is asked whether to abort or to reenter the signature identification and security code. If the operator responds by touching the no command box 40, the program branches back to the beginning of input box 250. If the reset command box 42 is touched, the program branches back to the main menu routine through off page connector 84. If the operator verifies the code and reenters the same code as previously selected, the program proceeds to process box 260 where the signature identification and security code are stored on disc memory 18 (FIG. 1). After saving the signature identification and code, the program proceeds back to the main menu routine through off page connector 84.

Figure 10:
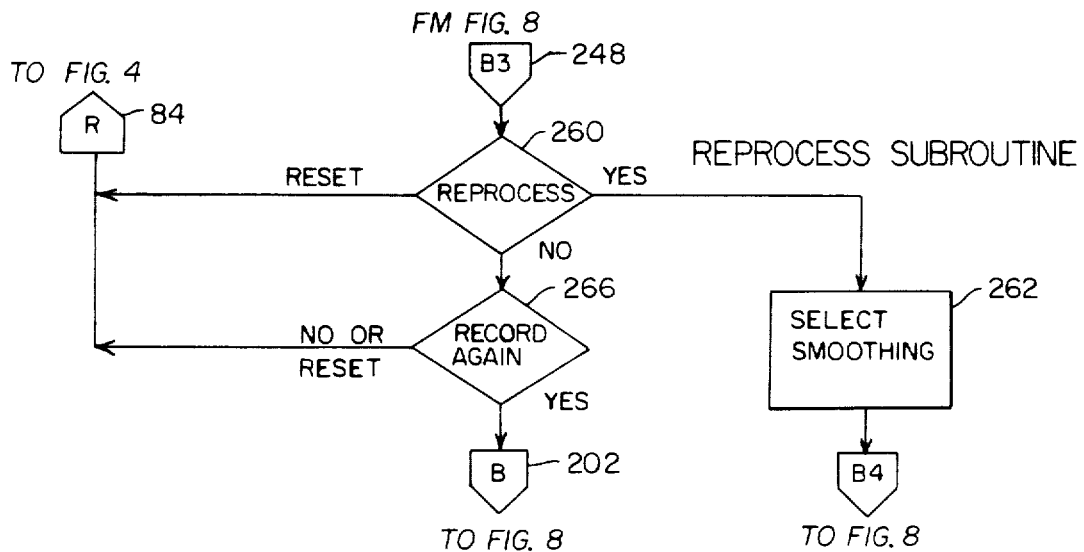
Figure 12:
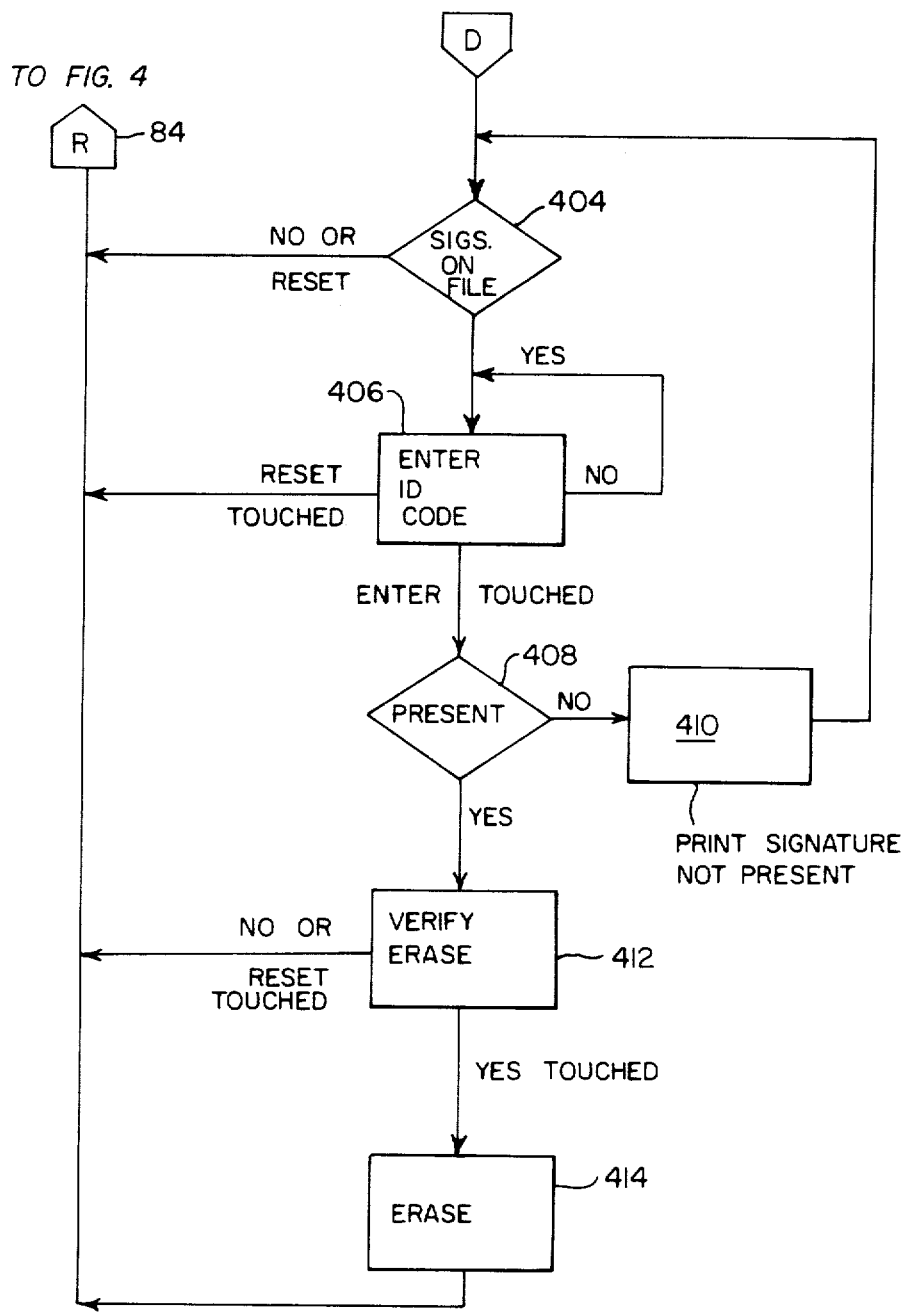
FIG. 12 is a schematic flow chart of the program routine that erases a signature file.

With reference now to FIG. 10, the program proceeds through offpage connector 248 from FIG. 8 if the operator indicates that the signature is not to be saved. The program enters decision box 260 and asks the operator whether to reprocess the signature. It is noted, as described hereinbelow, that the operator can select the reprocessing level. This can be done at this time and is described in greater detail hereinbelow.

If the operator indicates to reprocess the signature, then the program proceeds to process box 262 where the operator is requested to select the smoothing level desired. This procedure is also described hereinbelow. As soon as the operator selects the smoothing level by touching the appropriate numerical square 36, and then touches the enter command box 44, the program branches back to the recording routine of FIG. 8 through offpage connector 264 and the data is reprocessed in subroutine box 222 and the subsequent steps repeated.

If the operator selects not to reprocess the data, the program branches to decision box 266 where the operator is asked whether another signature is to be recorded. If the operator touches the yes command box 38, then the program branches back to the top of the recording routine (beginning in FIG. 8) through offpage connector 202. On the other hand, if the operator touches the reset command box 42 when asked by the program when in decision box 260 or 266, then the program branches back to the main menu routine depicted in FIG. 4 through offpage connector 84.

Figure 11:
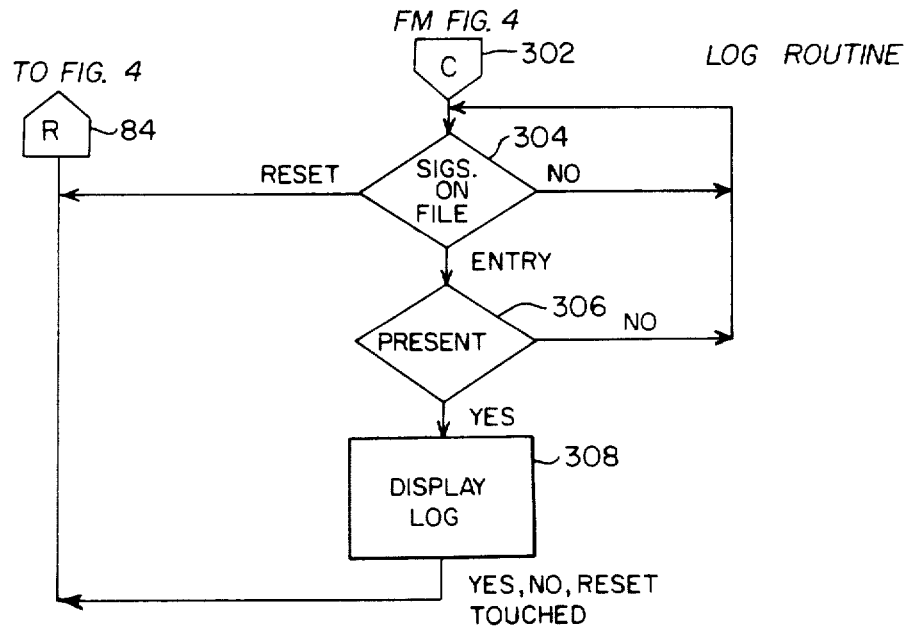
FIG. 11 is a schematic flow chart of the program routine for displaying the log of the history of a particular signature file.

Returning once again to the main menu routine in FIG. 4, if the operator when asked whether to record a new signature in decision box 200 touches the no command box 40, the program proceeds to decision box 300. In decision box 300, the program asks the operator whether a review of the signature log is desired. The program keeps track of all uses of a particular signature file, the particular user and the date and time of use to provide desirable accounting information to the operator. The purpose of the log routine 300 is to provide the information that has been kept to the operator. As with decision boxes 100 and 200, the operator can select "reset", "yes", or "no". If the operator selects "yes", the program branches through offpage connector 302 to decision box 304 (FIG. 11).

In decision box 304, the program instructs the operator to supply the identification of the signature file that is desired. As with other selection procedures, decision box 304 requires the operator to supply the name of the signature identification by touching the appropriate one or ones of the alphanumeric square 34 and 36. The selected square is displayed on video monitor 46 (FIG. 1). If the operator makes a mistake or desires a different identification number, he or she touches the no command box 40, and the program branches back to the top of decision box 304. The operator also has the option of returning to the main menu routine depicted in FIG. 4 by touching reset command box 42, whereupon the program branches through off page connector 84 back to the top of decision box 100 in FIG. 4.

As soon as the operator has selected the identification of the signature file and has touched the enter command box 44, the program branches to decision box 304. In decision box 304, the system checks to see that the signature is on file. If the signature is not on file, the operator is prompted by a message displayed on video monitor 46 to install a new diskette. If the signature identification identifies a signature that is on file, the system proceeds to process box 308 where the log information is caused to be displayed on video monitor 46. When the operator is finished with the display, he or she can touch yes, no, or reset command boxes 38, 40 or 42 to return the system back to the main menu routine depicted in FIG. 4 through offpage connector 84.

Returning to FIG. 4, if the operator touches the no command box 40 when the program box is in decision box 300, the program branches to decision box 400. In decision box 400, the program prompts the operator by displaying a message on video monitor 46 asking if the operator desires to erase a signature. If the operator touches yes command box 38, the program branches through offpage connector 402 to decision box 404 in FIG. 12. Alternatively, the operator can touch reset command box or no command box 42 or 40, whereupon the system returns back to the beginning of decision box 100.

In decision box 404 of the erase routine, the program displays the signatures on the diskette and asks the operator by printing a message on video monitor 46 whether the signature sought to be erased is on file. If the operator touches no or reset command boxes 40 or 42, the system branches back through offpage connector 84 to the main menu routine in FIG. 4. If the operator touches the yes command box 38, the system branches to process box 406 where the operator is instructed to enter the identification code of the signature on file. As the operator selects the appropriate alphanumeric squares 34 and 36, the selected choice is displayed on video monitor 46. If the operator makes an error, the operator can touch the no command box 40 and the program will return to the top of process box 406. When the operator touches the enter command box 44, the program branches to decision box 408. In decision box 408, the program ascertains whether the file for the requested signature identification code is present on the installed diskette. If the file is not present, the program branches to process box 410 whereupon the message "Signature not present" is printed on video monitor 46, and the program branches to the top of decision box 404. If the requested signature file is present, the program proceeds to process box 412. In process box 412, the program requests the operator to verify that the selected signature file is in fact to be erased by displaying an appropriate message on video monitor 46. If the operator touches the no or reset command boxes 40 or 42, the program branches back to the main menu routine through offpage connector 84. If the operator touches the yes command box 38, the program proceeds to process box 414. In process box 414, the program erases the identified signature file and then returns to the main menu routine through offpage connector 84.

As mentioned above with respect to nested refine subroutine 222 (FIG. 8B) of the recording routine, the present invention also involves refining the received signature. The refined subroutine 22 involves not only compacting data but also smoothing the signature in accordance with a preselected, variable amount of smoothing. The algorithm for performing the smoothing function will now be described with reference being had to FIGS. 3A through 3E and Appendices 1 and 2.

As mentioned above, digitizer pad 20 sends 200 points per second to microcomputer 12. After the program has disregarded all points generated when cursor 22 was not touching the top of digitizer pad 20 and "compacting" the remaining points, the program performs a smoothing function on the remaining points Basically, the computer compares all the remaining points in sets of three, beginning with the first point generated, and then proceeding in the direction of the drawn line. FIG. 3A shows a signature of D.L. Hardin as actually written on digitizer pad 20 while the recording routine was being run. The point coordinates which form the signature data as actually received by microcomputer 12 and stored in ram buffer 14 are depicted in Appendix 1, attached hereto. The data as produced does not have carriage returns or spaces between the X and Y coordinates. However, for the purposes of display, a basic program was written to print the data in the format as it appears in Appendix 1. There are six data points listed in each row in pairs of two. Thus, columns A and B represent, respectively, the X and Y coordinates of a single point and columns C and D represent the X and Y coordinates of the next point adjacent to the point appearing in columns A and B.

As soon as the signer position cursor 22 proximate to the top of digitizer pad 20, digitizer pad 20 commenced sending points to microcomputer 12 at the rate of two hundred points per second. Because cursor 22 was not in contact with digitizer pad 20, the first group of points in the uppermost box of Appendix 1 have the X coordinate (i.e. the value in columns A, C, E, G, I and K) preceded by a "0". Thus, digitizer pad 20 sent thirty-eight points to microcomputer 12 from the time cursor 22 was proximate to digitizer pad 20 until the "pen down" signal was sent. The first point in which the "pen down" signal was sent has the coordinates listed in columns E and F in row 7. Thus, the absolute position from the origin of digitizer pad 20, which is in the lower left hand corner thereof, is X=2.976 inches, Y=9.37 inches. This point was generated at location 502 in the signature of FIG. 3A. It can also be seen that the X coordinate in column E is preceded by the number "1" indicating that the "pen down" signal has been received by microcomputer 12. Every five thousandths of a second, digitizer pad 20 sent the coordinates of a point. As can be seen from FIG. 3A, the signers pen moved downwardly toward the bottom left hand corner of digitizer pad 20. Thus it can be expected that both the X and the Y coordinates should decrease. This can be seen in the next coordinate point listed in columns G and H of row 7 whereby the absolute value of the X position changed by two thousandths of an inch toward the left hand side, but the Y position did not change at all. Since each point is sent every five thousandths of a second, the space between points will simply be a function of the time it takes the signer to move the pen over digitizer pad 20. In row 46,. columns G and H, it can be seen that for one hundredths of a second the computer received a pen up signal because the X coordinate is preceded by a "0". Based on a review of the signature, it can be seen that the signers pen did not leave the paper except to place a dot above the i, the dot being denoted by numeral 504. It is believed that the pen up signal received in row 46, as well as the pen up signals received in rows 48 and 49 are probably the result of the signers simply not bearing down on the pen. In any case, they are aberations in the overall signature. It can be noticed that there is a distance between the absolute positions of the point coordinates located before and after the groups of "pen up" coordinates. This is one reason why the signatures should be smoothed with a smoothing program. A further observation is that dot 504 in FIG. 3A can be seen in the raw data in Appendix A in the entire row 56. This means that it took six data points or three hundredths of a second for the signer to dot the "i" of the signature. It should also be observed that the coordinates of the dot are substantially the same, thereby confirming that these data points do indeed designate dot 504.

Figure 3D:
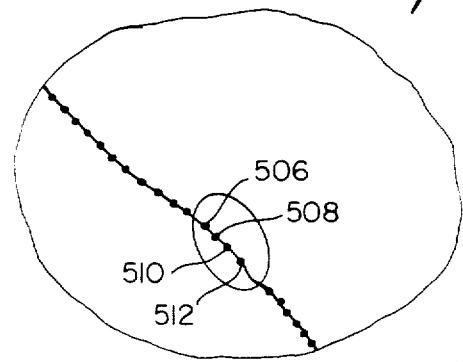
FIG. 3D is an enlarged portion of FIG. 3C.
Figure 3C:
Figure 3E:
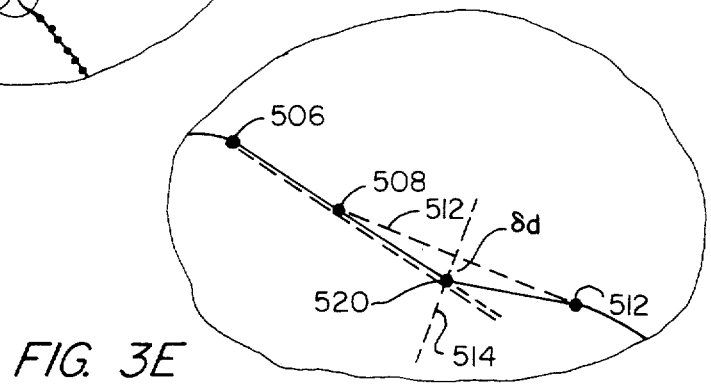
FIG. 3E is an enlarged portion of FIG. 3D, both used to illustrate the smoothing algorithm utilized by the present invention.

The operation of the smoothing algorithm will be briefly explained with reference to FIGS. 3D and 3E. Basically, the computer compares all of the points in sets of three, beginning with the first point generated and then proceeding in the direction of the drawn line. After performing the smoothing function on the first three points, the remote end point is dropped and a new set of three points is considered by adding the next point along the line. Thus, as shown in FIG. 3E, the first set of three points are 506, 508, and 510, and the second set of three points are 508, 510 and 512.

For each three point set, the computer calculates the equation for a straight line using the two end points. Next, the computer calculates the perpendicular distance, delta d, that the midpoint is off the calculated line. As shown in Fig. 3E, delta d is the distance between point 510 and dashed line 512 in a direction that is perpendicular to line 512 as indicated by dash line 514. The perpendicular distance, delta d, is then compared with a predesignated tolerance value, and if that tolerance value is exceeded, then the coordinates of the midpoint, 0.510 in FIG. 3E, are changed to bring the perpendicular distance, delta d, to within the selected tolerance value. In the present embodiment of the present invention, the selected tolerance values are from a maximum smoothing of 0.001 inches to 0.005 inches, in steps of 0.001 inches, for the least amount of smoothing.

FIG. 3B represents the result of the program applying the maximum amount of smoothing to the signature written and appearing in FIG. 3A. On the other hand, FIG. 3C is the plotted signature corresponding to that plotted in FIG. 3B, but without any smoothing whatsoever.

As mentioned above, after the smoothing algorithm has been performed on all of the received raw data, the program calculates the relative distance between points. This is done because plotter 48 operates faster using relative points than using absolute points, although the latter could also be used. In addition, it is noted that the smoothing algorithm is performed on the absolute data (see program line 15080 in the microfiche) because it is simplest. However, the program could also smooth after the relative values are calculated. The part of the program that calculates the relative values begins at line 15280 of the program. In addition, as can be seen from Appendix 2, the smoothing subroutine also supplies printer commands. The program first applies the command "A" to indicate that the following two data points are absolute values. The program supplies the absolute value for the first set of coordinates received after a pen down signal has been received. Following the absolute value, the program supplies the commands "R" and "D" to instruct plotter 48 that the subsequent points are relative movement positions from the preceding point and to place the plotter pen into contact with the paper, respectively. When a pen up signal is received after a pen down signal, the program supplies the commands "U" and "A" after the relative data point to instruct the plotter to raise the plotter pen from the paper and to move to the absolute position given by the next coordinate. All of the plotter commands in Appendix 2 are circled. It is noted that the set of points for the signature having the identification of "DLH100" and the identification "DLH5" represent the actual coordinates which were used to plot signatures in FIGS. 3C (where there was no smoothing) and FIG. 3B (where there was maximum smoothing). Appendix 3 contains a computer program listing.

The present invention has now been described with respect to a presently preferred embodiment thereof. Obviously, other features and modifications of the present invention would be apparent to those skilled in the art.

APPENDIX I

| | A | | B | | C | | D | | E | | F | | G | | H | | I | | J | | K | | L |
|---|---|---|---|---|---|---|---|---|---|---|---|---|---|---|---|---|---|---|---|---|---|---|
| 1 | 003198 | 09504 | 003187 | 09472 | 003175 | 09425 | 003151 | 09374 | 003115 | 09322 | 003009 | 09259 |
| | 003052 | 09187 | 003005 | 09114 | 002981 | 09047 | 002950 | 08992 | 002929 | 08742 | 002919 | 08878 |
| | 002911 | 08879 | 002913 | 08884 | 002927 | 08912 | 002950 | 08954 | 002978 | 08990 | 002994 | 09011 |
| | 002978 | 09021 | 002999 | 09016 | 002985 | 08999 | 002977 | 08981 | 002967 | 08964 | 002966 | 08956 |
| 5 | 002968 | 08952 | 002970 | 08953 | 002977 | 08961 | 002986 | 08978 | 002995 | 08994 | 003000 | 09011 |
| | 003003 | 09024 | 003003 | 09031 | 003004 | 09032 | 002997 | 09031 | 002993 | 09034 | 002988 | 09036 |
| | 002983 | 09035 | 002979 | 09036 | 102976 | 09037 | 102974 | 09037 | 102972 | 09036 | 102972 | 09037 |
| | 102972 | 09035 | 102972 | 09037 | 102972 | 09036 | 102973 | 09037 | 102973 | 09036 | 102972 | 09035 |
| | 102973 | 09035 | 102972 | 09035 | 102971 | 09033 | 102970 | 09033 | 102968 | 09029 | 102962 | 09021 |
| 10 | 102936 | 08972 | 102887 | 08891 | 102844 | 08798 | 102808 | 08724 | 102792 | 08683 | 102772 | 08650 |
| | 102761 | 08636 | 102756 | 08633 | 102750 | 08631 | 102750 | 08635 | 102753 | 08639 | 102764 | 08654 |
| | 102781 | 08673 | 102805 | 08711 | 102836 | 08763 | 102870 | 08812 | 102900 | 08845 | 102906 | 08859 |
| | 102910 | 08865 | 102912 | 08867 | 102911 | 08864 | 102907 | 08849 | 102895 | 08821 | 102883 | 08783 |
| | 102869 | 08741 | 102868 | 08707 | 102869 | 08687 | 102872 | 08676 | 102889 | 08660 | 102910 | 08655 |
| 15 | 102930 | 08664 | 102974 | 08708 | 103031 | 08776 | 103059 | 08863 | 103089 | 08945 | 103114 | 09015 |
| | 103126 | 09076 | 103122 | 09116 | 103113 | 09138 | 103090 | 09147 | 103074 | 09151 | 103054 | 09145 |
| | 103031 | 09123 | 103012 | 09081 | 102989 | 09030 | 102964 | 08977 | 102963 | 08932 | 102973 | 08872 |
| | 102985 | 08858 | 103011 | 08831 | 103032 | 08814 | 103067 | 08815 | 103118 | 08840 | 103196 | 08883 |
| | 103251 | 08935 | 103283 | 08993 | 103303 | 09040 | 103314 | 09064 | 103312 | 09075 | 103306 | 09074 |
| 20 | 103287 | 09063 | 103276 | 09042 | 103243 | 08990 | 103221 | 08912 | 103176 | 08816 | 103151 | 08728 |
| | 103117 | 08661 | 103090 | 08627 | 103081 | 08626 | 103074 | 08648 | 103069 | 08692 | 103070 | 08757 |
| | 103067 | 08815 | 103057 | 08867 | 103051 | 08898 | 103051 | 08904 | 103049 | 08898 | 103051 | 08876 |
| | 103056 | 08831 | 103071 | 08786 | 103087 | 08748 | 103103 | 08723 | 103134 | 08710 | 103156 | 08708 |
| | 103198 | 08727 | 103252 | 08757 | 103274 | 08789 | 103289 | 08822 | 103296 | 08853 | 103303 | 08875 |
| 25 | 103310 | 08885 | 103311 | 08885 | 103304 | 08876 | 103288 | 08847 | 103276 | 08801 | 103261 | 08741 |
| | 103239 | 08683 | 103228 | 08635 | 103210 | 08608 | 103188 | 08605 | 103173 | 08646 | 103160 | 08729 |
| | 103162 | 08811 | 103165 | 08860 | 103167 | 08875 | 103165 | 08874 | 103164 | 08855 | 103167 | 08807 |
| | 103176 | 08744 | 103197 | 08692 | 103215 | 08661 | 103245 | 08656 | 103293 | 08683 | 103328 | 08732 |
| | 103368 | 08791 | 103399 | 08841 | 103431 | 08900 | 103448 | 08962 | 103465 | 09001 | 103470 | 09005 |
| 30 | 103457 | 08979 | 103433 | 08917 | 103395 | 08836 | 103370 | 08759 | 103361 | 08690 | 103352 | 08629 |
| | 103341 | 08592 | 103341 | 08595 | 103349 | 08623 | 103375 | 08722 | 103389 | 08839 | 103396 | 08936 |
| | 103387 | 09003 | 103363 | 09035 | 103346 | 09032 | 103300 | 08980 | 103276 | 08886 | 103254 | 08784 |
| | 103255 | 08707 | 103269 | 08670 | 103297 | 08655 | 103337 | 08653 | 103397 | 08677 | 103440 | 08715 |
| | 103463 | 08754 | 103489 | 08785 | 103494 | 08795 | 103501 | 08796 | 103501 | 08788 | 103498 | 08769 |
| 35 | 103493 | 08740 | 103484 | 08712 | 103476 | 08691 | 103474 | 08689 | 103475 | 08691 | 103478 | 08700 |
| | 103483 | 08725 | 103493 | 08768 | 103493 | 08795 | 103490 | 08796 | 103481 | 08795 | 103471 | 08777 |
| | 103444 | 08731 | 103415 | 08682 | 103406 | 08649 | 103408 | 08631 | 103424 | 08626 | 103436 | 08635 |
| | 103464 | 08664 | 103503 | 08724 | 103520 | 08769 | 103530 | 08786 | 103528 | 08785 | 103520 | 08777 |
| | 103509 | 08747 | 103483 | 08699 | 103470 | 08657 | 103465 | 08653 | 103472 | 08631 | 103486 | 08634 |
| 40 | 103504 | 08651 | 103532 | 08679 | 103559 | 08711 | 103585 | 08749 | 103602 | 08774 | 103607 | 08782 |
| | 103612 | 08777 | 103617 | 08765 | 103613 | 08742 | 103600 | 08709 | 103585 | 08681 | 103581 | 08666 |
| | 103580 | 08658 | 103583 | 08650 | 103585 | 08649 | 103587 | 08648 | 103589 | 08650 | 103590 | 08649 |
| | 103591 | 08648 | 103593 | 08646 | 103595 | 08647 | 103599 | 08648 | 103614 | 08666 | 103637 | 08693 |
| | 103663 | 08726 | 103691 | 08750 | 103710 | 08762 | 103715 | 08766 | 103715 | 08764 | 103710 | 08753 |
| 45 | 103708 | 08745 | 103705 | 08738 | 103701 | 08733 | 103700 | 08731 | 103703 | 08734 | 103708 | 08749 |

```
103716 08769  103715 08778  103700 08770  003682 08738  003647 08691  103626 08650
103628 08626  103635 08612  103642 08614  103683 08647  103729 08718  103776 08838
103830 08948  103854 08999  103857 09017  103851 09016  003827 08983  003790 08902
003756 08793  103714 08696  103694 08659  103696 08625  103705 08630  103715 08651
103748 08689  103782 08730  103809 08762  103811 08763  103806 08757  103776 08731
103787 08695  103782 08666  103783 08653  103786 08653  103790 08654  103793 08656
103801 08664  103834 08695  103847 08715  103850 08716  103849 08713  103845 08703
103843 08686  103844 08667  103848 08664  103856 08666  103884 08676  103922 08696
103973 08718  104016 08732  104027 08735  104023 08744  004001 08767  003989 08812
003988 08873  003989 08923  003972 08942  003941 08934  003919 08923  003909 08916
103908 08907  103907 08907  103907 08906  103907 08906  103917 08906  103928 08934
003963 09060
```

APPENDIX II

DLH100

(A)-537,726(R)(D) 0,-2 1,-2 -1,0 2,0 -2,0 1,0 -1,1 1,0 1,-1 0,1 0,-1 2,-1 0,-1 4,-2 8,-6 49,-26 81,-49 93,-43 74,-36 41,-16 33,-20 14,-11 3,-5 2,-6 -4,0 -4,3 -15,1 1 -19,17 -38,24 -33,30 -14,6 -6,4 -2,3 -1 15,-4 28,-12 38,-12 42 ,-14 34,-1 20,1 11,3 16,17 5,21 -9,20 -44,44 -68,57 -87,28 -82,30 -70,25 -61,12 -40,-4 -22,-9 -9,-23 -4,-16 6,-20 22,-23 42,-19 51,-23 53,-25 45,-1 40,10 34,12 27,26 17,21 -1,35 -25,51 -43,78 -52,55 -58,32 -47,20 -24,11 -11,-2 1,-6 11,-19 2 1,-11 52,-33 78,-22 96,-45 88,-25 67,-34 34,-27 1,-9 -22,-7 -44,-5 -65,1 -58,-3 -52,-10 -31,-6 -6,0 6,-2 22,2 45,5 45,15 38,16 25,16 13,31 2,22 -19,42 -30,54 -3 2,22 -33,15 -31,7 -22,7 -10,7 0,1 9,-7 29,-16 46,-12 60,-15 58,-22 48,-11 27,-18 3,-22 -41,-15 -83,-13 -82,2 -49,3 -15,2 1,-2 19,-1 48,3 63,9 52,21 31,18 5,30 - 27,48 -49,35 -59,40 -50,31 -59,32 -62,17 -39,17 -4,5 26,-13 62,-24 81,-38 77,-25 69,-9 61,-9 37,-11 -3,0 -28,8 -99,26 -117,14 -97,7 -67,-9 -32,-24 3,-17 52,-46 94,-24 102,-22 77,1 37,14 15,28 2,40 -24,60 -38,43 -39,23 -31,26 -10,5 -1,7 8,0 19,-3 29,-5 28,-9 21,-8 2,-2 -2,1 -9,3 -25,5 -43,10 -27,0 -1,-3 1,-9 18,-10 46,- 27 49,-29 33,-9 18,2 5,16 -9,12 -29,28 -60,39 -45,17 -17,10 1,-2 8,-8 30,-11 48, -26 42,-13 20,-5 6,7 -3,14 -17,18 -28,28 -32,27 -38,26 -25,17 -8,5 5,12 5 23,- 4 33,-13 28,-15 15,-4 8,-1 8,3 1,2 1,2 -2,2 1,1 1,1 2,2 -1,4 -18,15 -27,23 -33,26 -24,28 -12,19 -4,5 2,0 11,-5 8,-2 7,-3 5,-4 2,-1 -3,3 -15,5 -20,8 -9,-1 8 ,-15(U)(A)-150,1376 (R)(D) 24,2 14,7 -2,7 -33,41 -71,46 -120,47 -110,54 -51,24 -18,3 1,-6(U)(A)-196,1464(R)(D) 57,-20 16,2 -7,9 -21,10 -38,33 -41,34 -32,27 -1,2 6,-5 2 6,-10 36,-9 29,-5 13,1 0,3 -1,4 -2,3 -8,8 -31,33 -20,13 -1,3 3,-1 10,-4 17,-2 19 ,1 3,4 -2,8 -10,28 -20,38 -22,51 -14,43 -3,11 -9,-4 (U)(A)-407,1658 (R)(D) 0,-1 1,0 0 ,0 0,10 -28,11(U)

DLH5

(A)-537,726(R)(D) 0,-2 0,-1 0,-1 0,0 0,0 0,1 0,0 1,0 0,0 1,0 0,-1 2,-1 0,-1 4,-2 28 ,-16 29,-16 87,-46 80,-41 61,-28 47,-24 30,-18 17,-11 9,-9 3,-4 -1,-1 0,-1 -17,1 4 -28,19 -40,25 -39,25 -41,32 -28,19 -27,19 -6,4 0,1 1,0 21,-8 22,-8 38,-12 38,- 7 29,-3 20,0 18,8 11,15 1,17 -21,31 -45,44 -66,36 -74,33 -72,29 -66,20 -53,8 -38 ,0 -23,-12 -14,-14 -4,-17 9,-20 26,-19 38,-21 46,-23 45,-12 43,-1 38,5 33,16 25, 18 12,27 -7,39 -25,58 -38,57 -48,44 -48,32 -36,22 -23,10 -11,2 0,-9 10,-10 31,-2 1 55,-22 75,-33 82,-29 74,-32 54,-29 28,-19 3,-13 -21,-9 -43,-4 -50,-4 -51,-7 -4 1,-6 -41,-7 0,-1 0,-1 22,2 45,10 41,13 33,15 23,23 13,22 -3,32 -17,43 -24,33 -29 ,24 -30,15 -26,11 -18,9 -17,9 0,1 19,-11 32,-12 46,-13 52,-18 50,-14 39,-16 21,- 19 -10,-17 -47,-15 -64,-7 -57,-2 -36,0 -17,-1 1,-1 24,1 44,5 48,13 39,16 22,23 - 2,35 -26,35 -42,38 -46,34 -53,33 -57,25 -57,25 -22,11 2,-1 3,-1 71,-31 74,-28 72 ,-18 66,-14 52,-12 52,-13 -3,0 -28,8 -108,20 -103,14 -85,2 -58,-11 -28,-14 12,-3 0 53,-27 78,-24 77,-12 57,1 36,15 19,27 -2,44 -20,43 -30,33 -30,30 -20,17 -11,12 -1,6 9,2 19,-2 23,-5 22,-7 12,-4 13,-5 -2,1 -9,3 -25,5 -35,5 -18,1 -9,-4 5,-7 2 5,-17 26,-17 41,-19 29,-8 17,4 4,8 -12,18 -36,28 -41,23 -40,22 -8,4 0,-2 15,-6 1 5,-7 45,-19 32,-12 19,-3 8,6 -4,12 -16,20 -24,23 -31,25 -28,21 -28,20 -2,5 5,5 1 4,1 24,-6 26,-11 20,-7 14,-4 11,-1 6,1 4,1 1,2 1,1 1,1 1,1 0,2 0,3 -9,9 -9,9 -27 ,23 -29,27 -20,23 -20,23 -1,3 5,-1 5,-2 8,-2 7,-3 5,-4 -1,1 0,1 -15,5 -15,4 -3,- 6 -3,-6(U)(A)-150,1376 (R)(D) 19,5 8,6 -12,23 -42,35 -81,41 -80,40 -110,54 -35,14 -1 7,4 -16,3(U)(A)-196,1464(R)(D) 36,-9 15,0 -3,5 -21,19 -31,27 -30,26 -32,27 2,-1 3,- 2 31,-9 30,-7 21,-3 11,0 5,2 1,2 -3,5 -17,19 -19,16 -10,10 -3,4 3,0 4,0 18,0 10, 2 4,5 -3,16 -11,27 -11,27 -18,47 -18,47 -6,4 -6,3(U)(A)-407,1658(R)(D) 0,-1 1,0 0,5 -14,8 -14,8(U)

Appendix III

```
30 TRUE=1: FALSE=0: BLANK$=SPACE$(39): LEVEL=1: ALLOW=5: ALLOW2=25: IPDELAY=35
35 DATDRV$="A:": WRKDRV$="A:"
40 DIGITIZER=2     '1=CALCOMP, 2=GTCO, 3=KEYBOARD
45 PLOTTER=2       '1=SCREEN, 2=FC595
47 FEEDER=2        '1=NOT PRESENT, 2=PRESENT
60 CLS
70 ON DIGITIZER GOSUB 10100,10200     '1=CALCOMP, 2=GTCO
80 GOSUB 8400      'CALL SUBROUTINE TO RESET FEEDER RELAYS
```

```
90 KEY OFF: FOR I=1 TO 10: KEY I,"": NEXT I: WIDTH 40
200 REM  ************************************************************
210 REM   SYSTEM INTRODUCTION
240 LOCATE 6,12: PRINT "SIGNATURE SYSTEMS"
245 LOCATE 8,20: PRINT "BY"
250 LOCATE 10,11: PRINT "E.S.P. SYSTEMS, INC."
260 LOCATE 14,14: PRINT "COPYRIGHT 1985"
270 LOCATE 16,11: PRINT "U.S. PATENT PENDING"
280 DELAYLEN=2500*DIGITIZER: GOSUB 5000
400 REM  ************************************************************
410 REM   MENU INTRODUCTION.
430 CLS
440 CURRTIME$=LEFT$(TIME$,2)
450 IF VAL(CURRTIME$)<12 THEN MESS2$="MORNING" ELSE IF VAL(CURRTIME$)<18 THEN MESS2$="AFTERNOON" ELSE MESS2$="EVENING"
455 MES$="GOOD "+MESS2$
460 LOCATE 10,((42-LEN(MES$))/2): PRINT MES$
470 LOCATE 15,11: PRINT "DO YOU WANT TO USE A"
473 LOCATE 17,6: PRINT "PREVIOUSLY RECORDED SIGNATURE?"
475 LOCATE 19,15: PRINT "(YES/NO)   ";
480 GOSUB 5200
485 IF CHOICE$="YES" THEN 600
490 IF CHOICE$="NO" THEN 2400
495 IF CHOICE$="RESET" THEN 400
600 REM  ************************************************************
610 REM   SCREEN 3
630 CLS
640 LOCATE 6,1: PRINT "SIGNATURES ON FILE ARE:": PRINT
650 FILES DATDRV$+"*.DAT"
660 LOCATE 15,5: PRINT "DO YOU WANT TO USE ONE OF THESE?"
665 LOCATE 17,15: PRINT "(YES/NO)   ";
670 GOSUB 5200
675 IF CHOICE$="YES" THEN 800
680 IF CHOICE$="NO" THEN 2400
685 IF CHOICE$="RESET" THEN 400
800 REM  ************************************************************
810 REM   GET DESIRED SIGNATURE IDENTIFICATION AND SECURITY CODE
830 GOSUB 9700
840 ON BRANCH GOTO 860,400,600
850 GOTO 600
860 GOSUB 9800
870 ON BRANCH GOTO 1200,400
880 GOTO 600
1200 REM  ************************************************************
1210 REM   SCREEN 5
1220 REM  ************************************************************
1230 CLS
1240 LOCATE 15,11: PRINT "HOW MANY SIGNATURES"
1243 LOCATE 17,10: PRINT "DO YOU WISH TO WRITE?"
1245 LOCATE 19,20
1250 GOSUB 7400: JOBSIZE$=NUMBER$: JOBSIZE=VAL(JOBSIZE$)
1253 IF CHOICE$="NO" THEN 1200
1255 IF CHOICE$="RESET" THEN 400
1270 IF JOBSIZE<=0 THEN 1200
1280 IF JOBSIZE>1 THEN GOTO 1600
1400 REM  ************************************************************
1405 REM   SINGLE SHEET MODE
1410 REM  ************************************************************
1415 CLS
1420 LOCATE 15,6: PRINT "TOUCH WRITING PAD TO INDICATE"
1425 LOCATE 17,10: PRINT "BEGINNING OF SIGNATURE"
1430 LOCATE 19,6: PRINT "TOUCH 'RESET' TO TERMINATE JOB"
1435 LOCATE 21,18
1440 GOSUB 7600
1445 IF OFFSET$="RESET" THEN GOSUB 15510: GOTO 400
1450 IF VALID=TRUE THEN 1475
1455 GOSUB 7800
1460 IF CHOICE$="YES" THEN 1475
1465 IF CHOICE$="NO" THEN 1400
1470 IF CHOICE$="RESET" THEN GOSUB 15510: GOTO 400
1475 GOSUB 6200      'CALL SUBROUTINE TO CHECK FOR PAPER AND PREADVANCE
1480 IF READY=FALSE THEN GOSUB 5400: GOTO 1475
1485 GOSUB 8800      'CALL SUBROUTINE TO FEED PAPER
1490 CLS
```

```
1495 LOCATE 15,17: PRINT "PRINTING"
1500 LOCATE 19,6: PRINT "TOUCH 'RESET' TO TERMINATE JOB"
1505 LOCATE 21,18
1510 GOSUB 6400
1515 LOCATE 17,16: PRINT "COMPLETED"
1520 GOSUB 8000
1525 IF EOF(1)=-1 THEN 1415
1530 GOSUB 5200
1535 IF CHOICE$="RESET" THEN 1545
1540 GOTO 1475
1545 CLS
1550 LOCATE 15,15: PRINT "JOB HALTED"
1555 LOCATE 17,9: PRINT "TOUCH 'YES' TO CONTINUE"
1560 LOCATE 19,8: PRINT "TOUCH 'RESET' TO TERMINATE"
1565 LOCATE 21,18
1570 GOSUB 5200
1575 IF CHOICE$="YES" THEN 1415
1580 CLS
1585 LOCATE 15,13: PRINT "JOB TERMINATED"
1590 GOTO 2245
1600 REM ******************************************************************
1610 REM   SCREEN 7 - MULTIPLE SHEET MODE
1620 REM ******************************************************************
1630 CLS
1635 PLOTS=0
1640 LOCATE 15,6: PRINT "TOUCH WRITING PAD TO INDICATE"
1645 LOCATE 17,10: PRINT "BEGINNING OF SIGNATURE"
1647 LOCATE 19,6: PRINT "TOUCH 'RESET' TO TERMINATE JOB"
1648 LOCATE 21,18
1650 GOSUB 7600
1655 IF OFFSET$="RESET" THEN GOSUB 15510: GOTO 400
1670 IF VALID=TRUE THEN 1730
1680 GOSUB 7800
1705 IF CHOICE$="YES" THEN 1730
1710 IF CHOICE$="NO" THEN 1600
1715 IF CHOICE$="RESET" THEN GOSUB 15510: GOTO 400
1730 GOSUB 6200     'CALL SUBROUTINE TO CHECK FOR PAPER AND PREADVANCE
1740 IF READY=FALSE THEN GOSUB 5400: GOTO 1730
1750 PLOTS=PLOTS+1
1760 GOSUB 8800     'CALL SUBROUTINE TO FEED PAPER
1800 REM ******************************************************************
1810 REM   SCREEN 8
1820 REM ******************************************************************
1830 CLS
1840 LOCATE 15,10: PRINT "PRINTING # ";PLOTS;" OF ";JOBSIZE
1845 LOCATE 19,6: PRINT "TOUCH 'RESET' TO TERMINATE JOB"
1847 LOCATE 21,18
1850 GOSUB 6400
1855 LOCATE 17,16: PRINT "COMPLETED"
1860 GOSUB 8000
1870 IF PLOTS>=JOBSIZE THEN 2200
1880 IF EOF(1)=-1 THEN DELAYLEN=INT(XOFF/1.5): GOSUB 5000: GOTO 1730
1890 GOSUB 5200
1900 IF CHOICE$="RESET" THEN 1920
1910 GOTO 1730
1920 CLS
1930 LOCATE 15,8: PRINT "JOB HALTED AT # ";PLOTS;" OF ";JOBSIZE
1935 LOCATE 17,9: PRINT "TOUCH 'YES' TO CONTINUE"
1940 LOCATE 19,8: PRINT "TOUCH 'RESET' TO TERMINATE"
1945 LOCATE 21,18
1950 GOSUB 5200
1955 IF CHOICE$="YES" THEN DELAYLEN=INT(XOFF/1.5): GOSUB 5000: GOTO 1730
1960 CLS
1965 LOCATE 15,7: PRINT "JOB TERMINATED AT # ";PLOTS;" OF ";JOBSIZE
1970 GOTO 2245
2200 REM ******************************************************************
2210 REM   SCREEN 10
2220 REM ******************************************************************
2230 CLS
2240 LOCATE 15,15: PRINT "JOB COMPLETED
2245 LOCATE 17,2: PRINT "TOUCH 'YES' TO REUSE CURRENT SIGNATURE"
2250 LOCATE 19,4: PRINT "TOUCH 'RESET' TO START ANOTHER JOB"
2255 LOCATE 21,18
2260 GOSUB 5200
```

```
2265 IF CHOICE$="YES" THEN 1200
2267 GOSUB 15510
2270 GOTO 400
2400 REM ******************************************************************
2410 REM   SCREEN 11
2420 REM ******************************************************************
2430 CLS
2440 LOCATE 15,2: PRINT "DO YOU WISH TO RECORD A NEW SIGNATURE?"
2445 LOCATE 17,15: PRINT "(YES/NO)   ";
2450 GOSUB 5200
2455 IF CHOICE$="YES" THEN 2600
2460 IF CHOICE$="NO" THEN 4400
2465 IF CHOICE$="RESET" THEN 400

2600 REM ******************************************************************
2610 REM   SCREEN 12
2620 REM ******************************************************************
2630 CLS
2640 LOCATE 15,8: PRINT "WAIT FOR BEEP AND 'START'"
2650 LOCATE 17,4: PRINT "WRITE SIGNATURE WITH RECORDING PEN"
2660 LOCATE 19,6: PRINT "THEN REMOVE PEN FROM VICINITY"
2665 LOCATE 21,14: PRINT "OF WRITING PAD"
2670 GOSUB 6000
2700 REM ******************************************************************
2710 REM   SCREEN 12A
2720 REM ******************************************************************
2730 CLS
2740 LOCATE 15,14: PRINT "DATA ACCEPTED"
2750 LOCATE 17,9: PRINT "TOUCH 'YES' TO CONTINUE"
2755 LOCATE 19,5: PRINT "TOUCH 'NO' TO RE-ENTER SIGNATURE"
2757 LOCATE 21,19
2760 GOSUB 5200
2765 IF CHOICE$="YES" THEN 2775
2770 IF CHOICE$="NO" THEN GOSUB 9400: GOTO 2600
2772 IF CHOICE$="RESET" THEN GOSUB 9400: GOTO 400
2775 GOSUB 9200
2780 IF GOOD=FALSE THEN 2920
2800 REM ******************************************************************
2810 REM   SCREEN 13
2820 REM ******************************************************************
2830 CLS
2840 LOCATE 15,12: PRINT "SIGNATURE ACCEPTED"
2850 LOCATE 17,11: PRINT "DO YOU WANT A SAMPLE?"
2855 LOCATE 19,15: PRINT "(YES/NO)   ";
2860 GOSUB 5200
2865 IF CHOICE$="YES" THEN 2875
2870 IF CHOICE$="NO" THEN 3200
2872 IF CHOICE$="RESET" THEN GOSUB 9400: GOSUB 9600: GOTO 400
2875 SIGFILE$=WRKDRV$+"SIGDATA.PRO"
2880 CLS
2885 GOSUB 6200
2890 IF READY=FALSE THEN GOSUB 5400: GOTO 2880
2895 PLOTPOS$="6000": PLOTEJEC$="5620": OFFSET$="1620,1875": SCOFFSET$=OFFSET$
2897 GOSUB 8800
2900 GOSUB 6400
2910 GOTO 3200
2920 CLS
2925 GOSUB 9400: GOSUB 9600
2930 LOCATE 15,10: PRINT "SIGNATURE NOT ACCEPTED"
2940 LOCATE 17,7: PRINT "DO YOU WANT TO RECORD AGAIN?"
2945 LOCATE 19,15: PRINT "(YES/NO)   ";
2947 GOSUB 5200
2950 IF CHOICE$="YES" THEN 2600
2960 IF CHOICE$="NO" THEN 400
2970 IF CHOICE$="RESET" THEN 400
3200 REM ******************************************************************
3210 REM   SCREEN 15
3220 REM ******************************************************************
3230 CLS
3240 LOCATE 15,3: PRINT "DO YOU WANT TO SAVE THIS SIGNATURE?"
3245 LOCATE 17,15: PRINT "(YES/NO)   ";
3250 GOSUB 5200
3265 IF CHOICE$="YES" THEN 3600
3270 IF CHOICE$="NO" THEN 3400
```

```
3275 IF CHOICE$="RESET" THEN GOSUB 9400: GOSUB 9600: GOTO 400
3280 GOTO 3600
3400 REM ****************************************************************
3410 REM   SCREEN 16
3420 REM ****************************************************************
3421 CLS
3422 LOCATE 15,2: PRINT "DO YOU WISH TO REPROCESS THE SIGNATURE"
3423 LOCATE 17,8: PRINT "WITH ADDITIONAL SMOOTHING?"
3424 LOCATE 19,15: PRINT "(YES/NO)   ";
3425 GOSUB 5200
3426 IF CHOICE$="YES" THEN 3500
3427 IF CHOICE$="NO" THEN 3430
3428 IF CHOICE$="RESET" THEN 3430
3430 CLS
3435 GOSUB 9400: GOSUB 9600
3440 LOCATE 15,13: PRINT "SIGNATURE ERASED"
3450 LOCATE 17,6: PRINT "DO YOU WANT TO RECORD ANOTHER?"
3455 LOCATE 19,15: PRINT "(YES/NO)   ";
3460 GOSUB 5200
3465 IF CHOICE$="YES" THEN 2600
3470 IF CHOICE$="NO" THEN 400
3475 IF CHOICE$="RESET" THEN 400
3480 GOTO 2600
3500 CLS
3505 LOCATE 15,4: PRINT "CURRENT LEVEL FOR SMOOTHING IS ";LEVEL
3510 LOCATE 17,6: PRINT "AVAILABLE LEVELS ARE 1,2,3,4,5"
3515 LOCATE 19,15: PRINT "SELECTION   ";
3520 GOSUB 7400: LEVEL=VAL(NUMBER$)
3523 IF LEVEL>5 THEN ALLOW=LEVEL ELSE ALLOW=6-LEVEL
3524 ALLOW2=ALLOW^2
3525 CLS
3530 GOTO 2775
3600 REM ****************************************************************
3610 REM   SCREEN 17
3620 REM ****************************************************************
3630 CLS
3640 LOCATE 15,9: PRINT "WHAT IDENTIFICATION WILL"
3643 LOCATE 17,11: PRINT "THIS SIGNATURE HAVE?"
3645 LOCATE 19,17
3650 GOSUB 5600: SIGID$=SELECTION$
3655 IF CHOICE$="RESET" OR CHOICE$="NO" THEN 3600
3670 GOSUB 6800
3680 GOSUB 5800
3690 IF EXIST=TRUE THEN 4800
3800 REM ****************************************************************
3810 REM   SCREEN 18
3820 REM ****************************************************************
3830 CLS
3840 LOCATE 15,11: PRINT "ENTER SECURITY CODE"
3843 LOCATE 17,11: PRINT "FOR THIS SIGNATURE"
3845 LOCATE 19,17
3850 GOSUB 5600: PASSWORD$=SELECTION$
3855 IF CHOICE$="RESET" OR CHOICE$="NO" THEN 3800
4000 REM ****************************************************************
4010 REM   SCREEN 19
4020 REM ****************************************************************
4030 CLS
4035 LOCATE 13,8: PRINT "THIS SIGNATURE WILL HAVE:"
4040 LOCATE 15,8: PRINT "IDENTIFICATION    ";SIGID$
4050 LOCATE 17,8: PRINT "SECURITY CODE     ";PASSWORD$
4060 LOCATE 19,13: PRINT "IS THIS CORRECT?"
4065 LOCATE 21,15: PRINT "(YES/NO)   ";
4070 GOSUB 5200
4085 IF CHOICE$="YES" THEN 4100
4090 IF CHOICE$="NO" THEN 3600
4095 IF CHOICE$="RESET" THEN GOSUB 9400: GOSUB 9600: GOTO 400
4100 GOSUB 6600
4200 REM ****************************************************************
4210 REM   SCREEN 20
4220 REM ****************************************************************
4230 CLS
4240 LOCATE 15,4: PRINT "SIGNATURE ";SIGID$;" IS NOW ON FILE"
4250 DELAYLEN=2500: GOSUB 5000
4260 GOTO 400
```

```
4400 REM ****************************************************************
4410 REM   SCREEN 21
4420 REM ****************************************************************
4430 CLS
4440 LOCATE 15,9: PRINT "DO YOU WISH TO SEE A LOG"
4443 LOCATE 17,12: PRINT "OF ANY SIGNATURE?"
4445 LOCATE 19,15: PRINT "(YES/NO)   ";
4450 GOSUB 5200
4455 IF CHOICE$="YES" THEN 4600
4460 IF CHOICE$="NO" THEN 4820
4465 IF CHOICE$="RESET" THEN 400
4600 REM ****************************************************************
4610 REM   SCREEN 22
4620 REM ****************************************************************
4630 CLS
4640 LOCATE 6,1: PRINT "SIGNATURES NOW ON FILE ARE:"
4650 FILES DATDRV$+"*.DAT"
4652 LOCATE 15,1: PRINT BLANK$
4653 LOCATE 17,1: PRINT BLANK$
4654 LOCATE 19,1: PRINT BLANK$
4660 LOCATE 15,6: PRINT "WHICH LOG DO YOU WISH TO SEE?"
4665 LOCATE 17,17
4670 GOSUB 5600: SIGID$=SELECTION$
4673 IF CHOICE$="NO" THEN 4652
4675 IF CHOICE$="RESET" THEN 400
4680 GOSUB 6800
4690 GOSUB 5800
4695 EXIST=TRUE
4700 IF EXIST=FALSE THEN 4600
4710 GOSUB 7000
4720 LOCATE 22,7: PRINT "TOUCH 'RESET' WHEN FINISHED   ";
4730 GOSUB 5200
4740 GOTO 400
4800 REM ****************************************************************
4802 REM   SCREEN 24
4804 REM ****************************************************************
4806 CLS
4808 LOCATE 15,4: PRINT "THIS IDENTIFICATION HAS BEEN USED"
4810 LOCATE 17,14: PRINT "CHOOSE ANOTHER"
4812 LOCATE 19,17
4814 GOTO 3650
4820 REM ****************************************************************
4822 REM   SCREEN 25
4824 REM ****************************************************************
4826 CLS: OP$=""
4828 LOCATE 15,4: PRINT "DO YOU WISH TO ERASE A SIGNATURE?"
4830 LOCATE 17,15: PRINT "(YES/NO)   ";
4832 GOSUB 5200
4834 IF CHOICE$="YES" THEN 4842
4836 IF CHOICE$="NO" THEN 400
4838 IF CHOICE$="RESET" THEN 400
4840 GOTO 400
4842 REM ****************************************************************
4844 REM   ERASE SIGNATURE
4846 REM ****************************************************************
4848 CLS
4850 LOCATE 6,1: PRINT "SIGNATURES ON FILE ARE:": PRINT
4852 FILES DATDRV$+"*.DAT"
4854 LOCATE 15,4: PRINT "DO YOU WANT TO ERASE ONE OF THESE?"
4856 LOCATE 17,15: PRINT "(YES/NO)  ";
4858 GOSUB 5200
4860 IF CHOICE$="YES" THEN 4866
4862 IF CHOICE$="NO" THEN 400
4864 IF CHOICE$="RESET" THEN 400
4866 GOSUB 9700
4867 ON BRANCH GOTO 4870,400,4842
4868 GOTO 4842
4869 GOSUB 9800
4870 GOSUB 9800
4872 ON BRANCH GOTO 4876,400
4874 GOTO 4842
4876 CLS
4878 LOCATE 15,2: PRINT "DO YOU REALLY WANT TO ERASE ";SIGID$;"?"
4890 LOCATE 17,15: PRINT "(YES/NO)   ";
```

```
4862 GOSUB 5200
4884 IF CHOICE$="YES" THEN 4890
4886 IF CHOICE$="NO" THEN 400
4888 IF CHOICE$="RESET" THEN 400
4890 GOSUB 15510
4892 KILL SIGFILE$
4898 GOTO 400
4990 STOP
5000 REM ****************************************************************
5010 REM   SUBROUTINE TO DELAY FOR A VARIABLE AMOUNT OF TIME
5020 REM ****************************************************************
5040 FOR I=1 TO DELAYLEN
5050 NEXT I
5060 RETURN
5200 REM ****************************************************************
5210 REM   SUBROUTINE TO ACCEPT YES/NO/RESET CHOICE
5220 REM ****************************************************************
5230 CHOICE$=""
5240 GOSUB 12470
5250 IF CHOICE$="YES" THEN PRINT CHOICE$: RETURN
5260 IF CHOICE$="NO" THEN PRINT CHOICE$: RETURN
5270 IF CHOICE$="RESET" THEN PRINT CHOICE$: RETURN
5280 GOTO 5240
5290 RETURN
5400 REM ****************************************************************
5410 REM   SUBROUTINE TO DISPLAY PRINTER NOT READY MESSAGE
5420 REM ****************************************************************
5430 CLS
5440 LOCATE 15,12: PRINT "PRINTER NOT READY"
5450 LOCATE 17,5: PRINT "PREPARE PRINTER AND TOUCH 'YES'"
5460 LOCATE 19,19
5470 BEEP: BEEP: BEEP: BEEP: BEEP
5480 GOSUB 5200
5490 RETURN
5600 REM ****************************************************************
5610 REM   SUBROUTINE TO ACCEPT TEXT ENTRIES
5620 REM ****************************************************************
5630 SELECTION$=""
5640 GOSUB 11720
5650 SELECTION$=TEXT$+SPACE$(8-LEN(TEXT$))
5660 RETURN
5800 REM ****************************************************************
5810 REM   SUBROUTINE TO CHECK THAT .DAT AND .USR FILES EXIST
5820 REM ****************************************************************
5825 EXIST=TRUE
5840 OPEN SIGFILE$ AS #2
5845 IF LOF(2)=0 THEN EXIST=FALSE: CLOSE #2: KILL SIGFILE$
5850 CLOSE #2
5860 OPEN SIGUSER$ AS #2
5865 IF LOF(2)=0 THEN EXIST=FALSE: CLOSE #2: KILL SIGUSER$
5870 CLOSE #2
5880 RETURN
6000 REM ****************************************************************
6010 REM   SUBROUTINE TO INPUT SIGNATURE DATA
6020 REM ****************************************************************
6030 GOSUB 13980
6050 RETURN
6200 REM ****************************************************************
6210 REM   SUBROUTINE TO CHECK FOR PAPER AND PREADVANCE
6220 REM ****************************************************************
6222 CLS
6223 LOCATE 10,18: PRINT "PREFEEDING"
6224 IF FEEDER=1 THEN INPUT "ENTER STATUS OF PREFEED - 1=READY, 0=NOT READY ",READY: RETURN
6225 READY=TRUE: PULSE=0: DELAYLEN=IPDELAY: PREMAX=50: SENSOR=239
6226 PAPER=INP(&H201): IF PAPER=SENSOR THEN GOSUB 9000
6227 IF READY=FALSE THEN RETURN
6230 GOSUB 8400: GOSUB 5000        'RESET RELAYS AND DELAY
6235 OUT &H201,0: OUT &H205,0
6240 GOSUB 5000
6245 OUT &H201,0: OUT &H203,0
6250 GOSUB 5000
6255 PAPER=INP(&H201): IF PAPER=SENSOR THEN GOSUB 8400: RETURN
```

```
6256 REM   INPUT"ENTER PAPER FEED STATUS - 0 IF NOT-ALIGNED, 1 IF ALIGNED   ",PAPE
R: IF PAPER=1 THEN GOSUB 8400: RETURN
6260 PULSE=PULSE+1: IF PULSE>=PREMAX THEN GOSUB 8400: READY=FALSE: RETURN
6265 OUT &H205,0: OUT &H207,0
6270 GOSUB 5000
6275 PAPER=INP(&H201): IF PAPER=SENSOR THEN GOSUB 8400: RETURN
6276 REM   INPUT"ENTER PAPER FEED STATUS - 0 IF NOT ALIGNED, 1 IF ALIGNED   ",PAPE
R: IF PAPER=1 THEN GOSUB 8400: RETURN
6280 PULSE=PULSE+1: IF PULSE>=PREMAX THEN GOSUB 8400: READY=FALSE: RETURN
6285 OUT &H203,0: OUT &H201,0
6290 GOSUB 5000
6295 PAPER=INP(&H201): IF PAPER=SENSOR THEN GOSUB 8400: RETURN
6296 REM   INPUT"ENTER PAPER FEED STATUS - 0 IF NOT ALIGNED, 1 IF ALIGNED   ",PAPE
R: IF PAPER=1 THEN GOSUB 8400: RETURN
6300 PULSE=PULSE+1: IF PULSE>=PREMAX THEN GOSUB 8400: READY=FALSE: RETURN
6305 OUT &H207,0: OUT &H205,0
6310 GOSUB 5000
6315 PAPER=INP(&H201): IF PAPER=SENSOR THEN GOSUB 8400: RETURN
6316 REM   INPUT"ENTER PAPER FEED STATUS - 0 IF NOT ALIGNED, 1 IF ALIGNED   ",PAPE
R: IF PAPER=1 THEN GOSUB 8400: RETURN
6320 PULSE=PULSE+1: IF PULSE>=PREMAX THEN GOSUB 8400: READY=FALSE: RETURN
6325 GOTO 6245
6400 REM   ****************************************************************
6410 REM   SUBROUTINE TO PLOT
6420 REM   ****************************************************************
6430 ON PLOTTER GOSUB 17500,14230      '1=SCREEN, 2=PC595
6450 RETURN
6600 REM   ****************************************************************
6610 REM   SUBROUTINE TO CREATE USER FILE AND SAVE SIGNATURE DATA
6620 REM   ****************************************************************
6630 CLS
6640 GOSUB 13150
6645 GOSUB 13330
6650 RETURN
6800 REM   ****************************************************************
6810 REM   SUBROUTINE TO CREATE NECESSARY FILE NAMES
6820 REM   ****************************************************************
6830 SIGFILE$=DATDRV$+SIGID$+SPACE$(8-LEN(SIGID$))+".DAT"
6840 SIGUSER$=DATDRV$+SIGID$+SPACE$(8-LEN(SIGID$))+".USR"
6850 RETURN
7000 REM   ****************************************************************
7010 REM   SUBROUTINE TO DISPLAY LOG
7020 REM   ****************************************************************
7030 GOSUB 11920
7040 GOSUB 15640
7050 GOSUB 15510
7060 RETURN
7200 REM   ****************************************************************
7210 REM   SUBROUTINE TO OPEN LOG FILE
7220 REM   ****************************************************************
7240 GOSUB 11920
7260 RETURN
7400 REM   ****************************************************************
7410 REM   SUBROUTINE TO ACCEPT NUMBER ENTRIES
7420 REM   ****************************************************************
7430 NUMBER$=""
7440 GOSUB 11720
7450 NUMBER$=TEXT$
7460 RETURN
7600 REM   ****************************************************************
7610 REM   SUBROUTINE TO ACCEPT AND CHECK SIGNATURE LOCATION
7620 REM   ****************************************************************
7640 GOSUB 11410
7650 GOSUB 11550
7660 RETURN
7800 REM   ****************************************************************
7810 REM   SUBROUTINE TO PRINT INVALID SIGNATURE LOCATION MESSAGE
7820 REM   ****************************************************************
7830 CLS
7840 LOCATE 15,5: PRINT "THE SELECTED LOCATION WILL LOSE"
7850 LOCATE 16,7: PRINT "ALL OR PART OF THE SIGNATURE"
7860 LOCATE 17,6:PRINT "IT EXCEEDS THE BOUNDARY ON THE"
7870 LOCATE 18,(21-LEN(ME$)/2): PRINT ME$
7890 LOCATE 19,8: PRINT "DO YOU WISH TO USE ANYWAY?"
```

```
7900 LOCATE 20,15: PRINT "(YES/NO)   ";
7910 GOSUB 5200
7920 RETURN
8000 REM  ****************************************************************
8010 REM   SUBROUTINE TO LOG PLOT IN USER FILE
8020 REM  ****************************************************************
8050 GOSUB 15380
8060 RETURN
8200 REM  ****************************************************************
8210 REM   SUBROUTINE TO ADVANCE PAPER FEED
8220 REM  ****************************************************************
8250 PULSE=0: DELAYLEN=IPDELAY
8255 GOSUB 8400: GOSUB 5000      'RESET RELAYS AND DELAY
8260 OUT &H201,0: OUT &H205,0
8265 GOSUB 5000
8270 OUT &H201,0: OUT &H203,0
8275 GOSUB 5000
8280 PULSE=PULSE+1: IF PULSE>=FWD THEN GOSUB 8400: RETURN
8285 OUT &H205,0: OUT &H207,0
8290 GOSUB 5000
8295 PULSE=PULSE+1: IF PULSE>=FWD THEN GOSUB 8400: RETURN
8300 OUT &H203,0: OUT &H201,0
8305 GOSUB 5000
8310 PULSE=PULSE+1: IF PULSE>=FWD THEN GOSUB 8400: RETURN
8315 OUT &H207,0: OUT &H205,0
8320 GOSUB 5000
8325 PULSE=PULSE+1: IF PULSE>=FWD THEN GOSUB 8400: RETURN
8330 GOTO 8270
8400 REM  ****************************************************************
8410 REM   SUBROUTINE TO RESET PAPER FEED RELAYS
8420 REM  ****************************************************************
8430 FOR I=1 TO 5
8440 OUT &H209,0
8450 NEXT I
8460 RETURN
8600 REM  ****************************************************************
8610 REM   SUBROUTINE TO PREADVANCE PAPER IN PLOTTER
8620 REM  ****************************************************************
8630 OPEN "COM2:9600,N,7,2,CS20000" AS #2    'OPEN COM PORT AS FILE 2
8640 PRINT #2,";: A EC1 U F-"+PLOTADV$+" @ ";
8650 CLOSE #2
8660 RETURN
8800 REM  ****************************************************************
8810 REM   SUBROUTINE TO FEED PAPER
8820 REM  ****************************************************************
8830 CLS
8840 LOCATE 10,18: PRINT "FEEDING"
8845 IF FEEDER=1 THEN DELAYLEN=1000: GOSUB 5000: RETURN
8850 FWD=148: GOSUB 8200
8900 PLOTADV$=PLOTPOS$: GOSUB 8600
8995 RETURN
9000 REM  ****************************************************************
9010 REM   SUBROUTINE TO CHECK FOR PAPER PREADVANCED AND CORRECT
9020 REM  ****************************************************************
9050 READY=FALSE: PULSE=0: DELAYLEN=IPDELAY: REVMAX=108: SENSOR=239
9060 GOSUB 8400: GOSUB 5000     'RESET RELAYS AND DELAY
9065 OUT &H203,0: OUT &H205,0
9070 GOSUB 5000
9075 OUT &H203,0: OUT &H201,0
9080 GOSUB 5000
9085 PAPER=INP(&H201): IF PAPER<>SENSOR THEN READY=TRUE: GOSUB 8400: RETURN
9090 REM  INPUT"ENTER PAPER FEED STATUS - 0 IF NOT ALIGNED, 1 IF ALIGNED   ",PAPER: IF PAPER<>1 THEN READY=TRUE: GOSUB 8400: RETURN
9095 PULSE=PULSE+1: IF PULSE>=REVMAX THEN GOSUB 8400: READY=FALSE: RETURN
9100 OUT &H205,0: OUT &H207,0
9105 GOSUB 5000
9110 PAPER=INP(&H201): IF PAPER<>SENSOR THEN READY=TRUE: GOSUB 8400: RETURN
9115 REM  INPUT"ENTER PAPER FEED STATUS - 0 IF NOT ALIGNED, 1 IF ALIGNED   ",PAPER: IF PAPER<>1 THEN READY=TRUE: GOSUB 8400: RETURN
9120 PULSE=PULSE+1: IF PULSE>=REVMAX THEN GOSUB 8400: READY=FALSE: RETURN
9125 OUT &H201,0: OUT &H203,0
9130 GOSUB 5000
9135 PAPER=INP(&H201): IF PAPER<>SENSOR THEN READY=TRUE: GOSUB 8400: RETURN
```

```
9140 REM   INPUT"ENTER PAPER FEED STATUS - 0 IF NOT ALIGNED, 1 IF ALIGNED   ",PAPE
R: IF PAPER<>1 THEN READY=TRUE: GOSUB 8400: RETURN
9145 PULSE=PULSE+1: IF PULSE>=REVMAX THEN GOSUB 8400: READY=FALSE: RETURN
9150 OUT &H207,0: OUT &H205,0
9155 GOSUB 5000
9160 PAPER=INP(&H201): IF PAPER<>SENSOR THEN READY=TRUE: GOSUB 8400: RETURN
9165 REM   INPUT"ENTER PAPER FEED STATUS - 0 IF NOT ALIGNED, 1 IF ALIGNED   ",PAPE
R: IF PAPER<>1 THEN READY=TRUE: GOSUB 8400: RETURN
9170 PULSE=PULSE+1: IF PULSE>=REVMAX THEN GOSUB 8400: READY=FALSE: RETURN
9175 GOTO 9075
9200 REM   ****************************************************************
9210 REM   SUBROUTINE TO PROCESS SIGNATURE DATA
9220 REM   ****************************************************************
9230 GOSUB 13540
9250 RETURN
9400 REM   ****************************************************************
9410 REM   SUBROUTINE TO KILL "SIGDATA.RAW"
9420 REM   ****************************************************************
9430 REM   KILL WRKDRV$+"SIGDATA.RAW"
9440 RETURN
9600 REM   ****************************************************************
9610 REM   SUBROUTINE TO KILL "SIGDATA.PRO"
9620 REM   ****************************************************************
9630 KILL WRKDRV$+"SIGDATA.PRO"
9640 RETURN
9700 REM   ****************************************************************
9703 REM   SUBROUTINE TO GET SIGNATURE IDENTIFICATION
9706 REM   ****************************************************************
9709 BRANCH=0
9712 LOCATE 15,1: PRINT BLANK$
9715 LOCATE 17,1: PRINT BLANK$
9718 LOCATE 19,1: PRINT BLANK$
9721 LOCATE 15,6: PRINT "ENTER SIGNATURE IDENTIFICATION"
9724 LOCATE 17,17
9727 GOSUB 5600
9730 IF CHOICE$="NO" THEN 9700
9733 IF CHOICE$="RESET" THEN BRANCH=2: RETURN
9736 SIGID$=SELECTION$
9739 GOSUB 6800
9742 GOSUB 5800
9745 IF EXIST=TRUE THEN GOSUB 7200: BRANCH=1: RETURN
9748 LOCATE 15,1: PRINT BLANK$
9751 LOCATE 16,1: PRINT BLANK$
9754 LOCATE 17,1: PRINT BLANK$
9757 LOCATE 15,6: PRINT "REQUESTED SIGNATURE NOT FOUND"
9760 LOCATE 17,12: PRINT "INSERT PROPER DISK"
9763 LOCATE 19,10: PRINT "TOUCH 'YES' WHEN READY"
9766 LOCATE 21,19
9769 GOSUB 5200
9772 BRANCH=3
9775 RETURN
9800 REM   ****************************************************************
9805 REM   SUBROUTINE TO GET SECURITY CODE
9810 REM   ****************************************************************
9815 CLS
9820 TRIES=0
9825 BRANCH=0
9830 LOCATE 15,11: PRINT "ENTER SECURITY CODE"
9835 LOCATE 17,10: PRINT "FOR SIGNATURE ";SIGID$;"
9840 LOCATE 19,17
9845 GOSUB 5600
9850 IF CHOICE$="NO" THEN 9800
9855 IF CHOICE$="RESET" THEN BRANCH=2: RETURN
9860 IF SELECTION$=USERID$ THEN BRANCH=1: RETURN
9865 TRIES=TRIES+1
9870 IF TRIES>=3 THEN 9890
9875 LOCATE 19,5: PRINT "WRONG SECURITY CODE - TRY AGAIN": BEEP
9880 DELAYLEN=1000: GOSUB 5000
9885 GOTO 9840
9890 LOCATE 19,11: PRINT "WRONG SECURITY CODE": BEEP
9895 DELAYLEN=1000: GOSUB 5000
9900 GOSUB 15950
9905 GOSUB 15510
9910 BRANCH=2: RETURN
```

```
10100 REM  ****************************************************************
10110 REM   SUBROUTINE TO INITIALIZE CALCOMP DIGITIZER
10120 OPEN "COM1:9600,E,7,2,CS,DS,CD"AS #1  'OPEN COM PORT          CALCOMP
                                             FOR DIGITIZER AS FILE 1
10130 PRINT #1,"Q"   'INITIALIZE DIGITIZER FOR POINT PROMPT MODE
10140 RETURN
10200 REM  ****************************************************************
10210 REM   SUBROUTINE TO INITIALIZE GTCO DIGITIZER
10220 OPEN "COM1:9600,N,8,2,CS,DS,CD" AS #1      'OPEN COM PORT      GTCO
                                                  FOR DIGITIZER AS FILE 1
10230 COMMAND$="RS"
10240 GOSUB 19000
10250 RETURN
10300 REM  ****************************************************************
10310 REM   SUBROUTINE TO INPUT FROM KEYBOARD
10320 REM  ****************************************************************
10330 KYBD$=INKEY$
10340 IF KYBD$="" THEN GOTO 10330
10350 IF LEN(KYBD$)>1 THEN FUNC=ASC(RIGHT$(KYBD$,1))-58 ELSE ENTRY$=KYBD$
10360 ON FUNC GOTO 10370,10380,10390
10370 CHOICE$="YES": GOTO 10395
10380 CHOICE$="NO": GOTO 10395
10390 CHOICE$="RESET": GOTO 10395
10395 RETURN
10400 REM  ****************************************************************
10410 REM   SUBROUTINE TO READ CALCOMP SIGNATURE DATA POINT
10420 REM  ****************************************************************
10430 A$=INPUT$(12,#3)
10440 XD$=MID$(A$,1,4): YD$=MID$(A$,6,4): C$=MID$(A$,11,1)
10450 X$=STR$(8500-5*VAL(YD$)): Y$=STR$(5*VAL(XD$)-2250)
10460 RETURN
10500 REM  ****************************************************************
10510 REM   SUBROUTINE TO READ GTCO SIGNATURE DATA POINT
10520 REM  ****************************************************************
10530 A$=INPUT$(13,#3)
10540 XD$=MID$(A$,3,4): YD$=MID$(A$,9,4): C$=MID$(A$,1,1)
10550 X$=STR$(8500-VAL(YD$)): Y$=STR$(VAL(XD$)-2250)
10560 RETURN
10600 REM  ****************************************************************
10610 REM   SUBROUTINE TO INITIALIZE CALCOMP FOR SIGNATURE ENTRY
10620 REM  ****************************************************************
10630 PRINT #1,"I";
10640 BEEP
10650 BEEPWAIT=1000: DATWAIT=1000
10660 RETURN
10700 REM  ****************************************************************
10710 REM   SUBROUTINE TO DESELECT CALCOMP FROM SIGNATURE ENTRY
10720 REM  ****************************************************************
10730 PRINT #1,"Q";
10740 ENDWAIT=1000
10750 RETURN
10800 REM  ****************************************************************
10810 REM   SUBROUTINE TO INITIALIZE GTCO FOR SIGNATURE ENTRY
10820 REM  ****************************************************************
10830 COMMAND$="CN"+CHR$(13)+"R2"
10840 GOSUB 19000
10860 BEEPWAIT=7000: DATWAIT=10000
10870 RETURN
10900 REM  ****************************************************************
10910 REM   SUBROUTINE TO DESELECT GTCO FROM SIGNATURE ENTRY
10920 REM  ****************************************************************
10930 COMMAND$="RS"
10940 GOSUB 19000
10950 ENDWAIT=3000
10960 RETURN
11400 REM  ****************************************************************
11410 REM   SUBROUTINE TO ENTER SIGNATURE LOCATION
11520 ON DIGITIZER GOSUB 12300,12400     '1=CALCOMP, 2=GTCO
11530 REM  CONVERT DATA TO UNITS OF .001 IN AND ADJUST FOR DIFFERENCE BETWEEN TH
E CORNER OF THE DIGITIZER AND THE CORNER OF THE PLOTTER
11540 XOFF=INT(1000*(X-.875)): YOFF=INT(1000*(Y-.375)): X$=STR$(XOFF): Y$=STR$(Y
OFF): GOSUB 16150: SCOFFSET$=X$+","+Y$
11541 IF XOFF+VAL(XMIN$)>3620 THEN PLOTPOS$="6000": PLOTEJEC$="5620": X$=STR$(XO
FF-3620): Y$=STR$(YOFF): GOSUB 16150: OFFSET$=X$+","+Y$
```

```
11542 IF XOFF+VAL(XMIN$)<=3620 THEN X$=STR$(9620-XOFF-VAL(XMIN$)): Y$=STR$(XOFF+
VAL(XMIN$)+2000): GOSUB 16150: PLOTPOS$=X$: PLOTEJEC$=Y$: X$=STR$(-VAL(XMIN$)):
Y$=STR$(YOFF): GOSUB 16150: OFFSET$=X$+","+Y$
11544 RETURN
11546 REM ****************************************************************
11548 REM  SUBROUTINE TO CHECK SIGNATURE LOCATION
11550 ME$=""
11555 VALID=TRUE
11557 IF Y>8.5 THEN OFFSET$="RESET": RETURN
11560 IF XOFF+VAL(XMIN$)<0 THEN ME$=ME$+" TOP "
11570 IF XOFF+VAL(XMAX$)>9250  THEN ME$=ME$+" BOTTOM "
11580 IF YOFF+VAL(YMIN$)<0  THEN ME$=ME$+" LEFT "
11590 IF YOFF+VAL(YMAX$)>7000  THEN ME$=ME$+" RIGHT "
11600 IF LEN(ME$)>0 THEN VALID=FALSE
11605 RETURN
11710 REM ****************************************************************
11720 REM  SUBROUTINE TO ENTER TEXT
11730 TEXT$=""       'CLEAR HOLDING VARIABLE
11740 STLIN=CSRLIN: STROW=POS(0)
11780 GOSUB 12470       'CALL SUBROUTINE TO ACCEPT KEYPAD ENTRY
11790 REM  CHECK FOR LETTER OR NUMBER OR 'STOP'
11800 IF ENTRY$="" AND (FUNC=0 OR FUNC=1) THEN 11780
11810 IF ENTRY$=CHR$(13) GOTO 11880
11820 IF CHOICE$="RESET" OR CHOICE$="NO" THEN 11900
11850 TEXT$=TEXT$+ENTRY$
11855 LOCATE CSRLIN,POS(0)-LEN(TEXT$)+1: PRINT TEXT$;
11860 GOTO 11780       'GO BACK TO GET ANOTHER ENTRY
11870 REM  CHECK THAT TOTAL ENTRY IS 8 OR FEWER CHARACTERS
11880 IF LEN(TEXT$)>8 THEN LOCATE 21,2: PRINT "ENTRY IS TOO LONG.  PLEASE BEGIN A
GAIN": BEEP: BEEP: DELAYLEN=1000: GOSUB 5000: LOCATE STLIN,1: PRINT BLANK$: LOCA
TE 21,1: PRINT BLANK$: LOCATE STLIN,STROW,1: GOTO 11730
11890 IF LEN(TEXT$)=0 THEN LOCATE 21,1: PRINT "ENTRY IS NOT VALID.  PLEASE BEGIN
 AGAIN": BEEP: BEEP: DELAYLEN=1000: GOSUB 5000: LOCATE STLIN,1: PRINT BLANK$: LO
CATE 21,1: PRINT BLANK$: LOCATE STLIN,STROW,1: GOTO 11730
11900 RETURN
11910 REM ****************************************************************
11920 REM  SUBROUTINE TO RETRIEVE USER FILE, RECORD OPEN TIME, AND UPDATE NUMBER
OF USERS
11930 OPEN SIGUSER$ AS #2 LEN=40
11940 FIELD #2,8 AS PW$,4 AS NU$,10 AS CRDT$,18 AS CRTM$
11950 FIELD #2,10 AS XMN$,10 AS XMX$,10 AS YMN$,10 AS YMX$
11960 FIELD #2,10 AS OPDT$,8 AS OPTM$,10 AS CLDT$,8 AS CLTM$,4 AS NS$
11970 GET #2,1
11980 USERID$=PW$: NU=VAL(NU$)+1: CRDATE$=CRDT$: CRTIME$=CRTM$
12000 LSET NU$=RIGHT$(STR$(NU),LEN(STR$(NU))-1)
12010 PUT #2,1
12020 GET #2,2
12030 XMIN$=XMN$: XMAX$=XMX$: YMIN$=YMN$: YMAX$=YMX$
12040 LSET OPDT$=DATE$
12050 LSET OPTM$=TIME$
12060 LSET CLDT$="9999999999"
12070 LSET CLTM$="99999999"
12080 LSET NS$="0"
12090 PUT #2,NU+2
12100 CLOSE #2
12110 RETURN
12290 REM ****************************************************************
12300 REM  SUBROUTINE TO INPUT SINGLE POINT FROM CALCOMP
12330 PRINT #1,"?"
12340 XY$=INPUT$(12,#1)      'INPUT ENTERED POINT
12350 XD=.005*VAL(MID$(XY$,1,4)): YD=.005*VAL(MID$(XY$,6,4))     'CONVERT DATA T
O UNITS OF INCHES
12355 X=11-YD: Y=XD     'CONVERSION TO NEW OVERLAY ORIENTATION
12380 RETURN
12390 REM ****************************************************************
12400 REM  SUBROUTINE TO INPUT SINGLE POINT FROM GTCO
12420 XY$=INPUT$(13,#1):     'INPUT ENTERED POINT
12430 XD=.001*VAL(MID$(XY$,2,5)): YD=.001*VAL(MID$(XY$,8,5))     'CONVERT DATA T
O UNITS OF INCHES
12435 X=11-YD: Y=XD     'CONVERSION TO NEW OVERLAY ORIENTATION
12450 RETURN
12460 REM ****************************************************************
12470 REM  SUBROUTINE TO RETURN SELECTED KEYPAD ITEM
```

```
12480 ENTRY$="": FUNC=0: CHOICE$="": ATTEMPTS=0        'INITIALIZE POSSIBLE VARIABLES
12490 ON DIGITIZER GOSUB 12300,12400,10300     '1=CALCOMP, 2=GTCO, 3=KEYBOARD
12500 REM   CHECK THAT INPUT IS WITHIN GENERAL BOUNDS OF KEYPAD AREA
12510 IF X<.5 OR X>10.5 GOTO 12580       'WITHIN X LIMITS
12520 IF Y<9! OR Y>10.5 GOTO 12580       'WITHIN Y LIMITS
12530 REM   TRANSFER CONTROL TO APPROPRIATE DECODE SUBROUTINE
12540 IF X>7.5 THEN GOSUB 12710: GOTO 12580      'FUNCTION
12550 IF X<5! THEN GOSUB 12830: GOTO 12580       'ALPHABET
12560 IF X>5.5 AND X<7.5 THEN GOSUB 12610: GOTO 12580      'NUMBER
12570 ENTRY$=CHR$(13): BEEP      'CARRIAGE RETURN
12580 IF ENTRY$="" AND FUNC=0 GOTO 12592     'CHECK AGAIN FOR ENTRY
12590 RETURN
12592 ATTEMPTS=ATTEMPTS+1: BEEP: BEEP
12594 IF ATTEMPTS<5 THEN 12490
12596 GOSUB 16060
12598 ATTEMPTS=0: GOTO 12490
12600 REM   ****************************************************************
12610 REM   SUBROUTINE TO DECODE THE NUMBER AREA
12620 REM   CONVERT ENTERED POINT INTO POSITION WITHIN THE NUMBER AREA
12630 REM   POSITIONS ARE NUMBERED 1 TO 10.  IF POSITION IS 10, CALL IT 0
12640 REM   ENTRIES FALLING NEAR THE LINES ARE ELIMINATED
12645 IF X>7! THEN GOTO 12680
12650 XC=2*X-INT(2*X): YC=2*Y-INT(2*Y)       'CHECK FOR NEAR LINE
12660 IF XC<.1 OR XC>.9 OR YC<.1 OR YC>.9 THEN RETURN     'WITHIN .050" OF LINE
12670 KEYPOS=3*CINT(2*(X-5.75))+CINT(2*(Y-8.75))      'CONVERT POINT TO POSITION
12675 GOTO 12690
12680 IF Y<9.5 OR Y>10! THEN RETURN
12682 XC=2*X-INT(2*X): YC=2*Y-INT(2*Y)       'CHECK FOR NEAR LINE
12684 IF XC<.1 OR XC>.9 OR YC<.1 OR YC>.9 THEN RETURN     'WITHIN .050" OF LINE
12686 KEYPOS=0
12690 ENTRY$=CHR$(48+KEYPOS): BEEP: RETURN       'CONVERT TO ASCII
12700 REM   ****************************************************************
12710 REM   SUBROUTINE TO DECODE THE FUNCTION AREA
12720 REM   CONVERT ENTERED POINT INTO POSITION WITHIN THE FUNCTION AREA
12730 REM   POSITIONS ARE NUMBERED 1 TO 3
12740 REM   ENTRIES FALLING NEAR THE LINES ARE ELIMINATED
12750 YC=Y/1.5-INT(Y/1.5): XC=X+.5-INT(X+.5)       'CHECK FOR ENTRY NEAR LINE
12760 IF YC<.04 OR YC>.96 OR XC<.05 OR XC>.95 THEN RETURN     'WITHIN .050" OF LINE
12770 FUNC=CINT(X-7)
12780 IF FUNC=1 THEN CHOICE$="YES": GOTO 12810
12790 IF FUNC=2 THEN CHOICE$="NO": GOTO 12810
12800 IF FUNC=3 THEN CHOICE$="RESET": GOTO 12810
12810  BEEP: RETURN
12820 REM   ****************************************************************
12830 REM   SUBROUTINE TO DECODE THE ALPHABET AREA
12840 REM   CONVERT ENTERED POINT INTO POSITION WITHIN THE ALPHABET AREA
12850 REM   POSITIONS ARE NUMBERED 1 TO 26.
12860 REM   ENTRIES FALLING NEAR THE LINES ARE ELIMINATED
12865 IF X>4.5 THEN GOTO 12910
12870 XC=2*X-INT(2*X): YC=2*Y-INT(2*Y)       'CHECK FOR NEAR LINE
12880 IF XC<.1 OR XC>.9 OR YC<.1 OR YC>.9 THEN RETURN     'WITHIN .050" OF LINE
12890 KEYPOS=3*CINT(2*(X-.75))+CINT(2*(Y-8.75))       'CONVERT DATA TO POSITION
12900 GOTO 12950
12910 IF Y<9.25 OR Y>10.25 THEN RETURN
12920 XC=2*X-INT(2*X): YC=2*(Y-.25)-INT(2*(Y-.25))       'CHECK FOR NEAR LINE
12930 IF XC<.1 OR XC>.9 OR YC<.1 OR YC>.9 THEN RETURN     'WITHIN .050" OF LINE
12940 KEYPOS=24+CINT(2*(Y-9))       'CONVERT DATA TO POSITION
12950 ENTRY$=CHR$(64+KEYPOS): BEEP: RETURN       'CONVERT TO ASCII
12955 REM   ****************************************************************
12960 REM   SUBROUTINE TO INPUT SIGNATURE DATA FOR CALCOMP
12965 REM   OPEN "COM1:9600,E,7,2,CS,DS,CD"AS #1      'OPEN COM PORT AS FILE 1
12970 OPEN WRKDRV$+"SIGDATA.RAW" FOR OUTPUT AS #3     'OPEN DATA FILE AS FILE 3
12975 PRINT #1,"I";: BEEP      'INITIALIZE DIGITIZER AT 100 POINTS/SEC
12980 FOR J=1 TO 500       'SET UP DELAY PRIOR TO BEEP
12985 NEXT J
12990 BEEP
12995 I=0       'INITIALIZE END OF DATA TIMEOUT LOOP
13000 I=I+1       'INCREMENT COUNTER
13010 IF I>1000 GOTO 13110       'CHECK FOR TIMEOUT
13020 IF EOF(1) THEN 13000       'IF NO INPUT CONTINUE TIMING
13030 A$=INPUT$(LOC(1),#1)       'INPUT DATA
13040 PRINT #3,A$;       'SAVE DATA
```

```
13050 CLS
13060 LOCATE 10,13: PRINT "ENTER SIGNATURE"
13070 LOCATE 12,7: PRINT "REMOVE PEN FROM WRITING PAD"
13080 LOCATE 14,14: PRINT "WAIT FOR MENU"
13090 I=0           'RESET TIMEOUT LOOP
13100 GOTO 13020    'GO BACK TO GET MORE DATA
13110 PRINT #1,"Q";       'DESELECT DIGITIZER
13120 CLOSE #3
13130 RETURN
13140 REM  ***********************************************************
13150 REM  SUBROUTINE TO SAVE SIGNATURE FILE TO DISK
13160 NAME WRKDRV$+"SIGDATA.PRO" AS SIGFILE$
13170 RETURN
13180 OPEN WRKDRV$+"SIGDATA.PRO" FOR INPUT AS #3    'OPEN PROCESSED DATA FILE AS 3
13190 OPEN SIGFILE$ FOR OUTPUT AS #2    'OPEN SIGNATURE FILE AS 2
13200 FILLEN=LOF(3)-1    'GET LENGTH OF FILE
13210 IF FILLEN<255 GOTO 13260    'CHECK FOR FULL BLOCK REMAINING
13220 A$=INPUT$(254,#3)    'INPUT FULL BLOCK
13230 PRINT #2,A$;: PRINT A$    'SAVE BLOCK AND DISPLAY
13240 FILLEN=FILLEN-254
13250 GOTO 13210    'GO BACK TO GET MORE DATA
13260 A$=INPUT$(FILLEN,#3)    'INPUT FINAL BLOCK
13270 PRINT #2,A$;    'SAVE FINAL BLOCK AND DISPLAY
13280 PRINT "ALL DATA STORED"
13290 CLOSE #2,#3
13300 GOSUB 9400: GOSUB 9600    'ERASE PROCESSED DATA FILE
13310 RETURN
13320 REM  ***********************************************************
13330 REM  SUBROUTINE TO CREATE USER FILE
13340 OPEN SIGUSER$ AS #2 LEN=40
13350 FIELD #2,8 AS PW$,4 AS NU$,10 AS CRDT$,18 AS CRTM$
13360 FIELD #2,10 AS XMN$,10 AS XMX$,10 AS YMN$,10 AS YMX$
13370 LSET PW$=PASSWORD$
13380 LSET NU$=RIGHT$(STR$(0),LEN(STR$(0))-1)
13390 LSET CRDT$=DATE$
13400 LSET CRTM$=TIME$
13410 PUT #2,1
13420 LSET XMN$=XMIN$
13430 LSET XMX$=XMAX$
13440 LSET YMN$=YMIN$
13450 LSET YMX$=YMAX$
13460 LSET XMN$=XMIN$
13470 LSET XMX$=XMAX$
13480 LSET YMN$=YMIN$
13490 LSET YMX$=YMAX$
13500 PUT #2,2
13510 CLOSE #2
13520 RETURN
13530 REM  ***********************************************************
13540 REM  SUBROUTINE TO PROCESS SIGNATURE DATA         FOR CALCOMP
13543 CLS
13546 LOCATE 10,14: PRINT "PROCESSING DATA"
13550 OPEN WRKDRV$+"SIGDATA.RAW" FOR INPUT AS #3
13560 OPEN WRKDRV$+"SIGDATA.PRO" FOR OUTPUT AS #2
13565 GOOD=TRUE
13570 P$="U "
13580 X1$="": X2$="": Y1$="": Y2$=""
13590 XMIN=0: XMAX=0: YMIN=0: YMAX=0
13600 IF EOF(3) THEN 13920
13605 ON DIGITIZER GOSUB 10400,10500
13610 REM   A$=INPUT$(12,#3)
13620 REM   X$=MID$(A$,1,4): Y$=MID$(A$,6,4): C$=MID$(A$,11,1)
13630 IF C$="0" AND P$="U " GOTO 13600
13640 IF C$="1" AND P$="U " GOTO 13690
13650 IF C$="1" AND P$="R D " GOTO 13760
13660 IF C$="0" AND P$="R D " GOTO 13860
13670 PRINT "PEN UP/DOWN ERROR AT X$= ";X$;" AND Y$= ";Y$;" WITH C$= ";C$;" AND P$= ";P$
13675 GOOD=FALSE
13680 GOTO 13950
13690 P$="R D "
13700 REM   X$=STR$(5*VAL(X$)-2500): Y$=STR$(5*VAL(Y$)-2250)
13705 GOSUB 16140
13710 GOSUB 17370
```

```
13720 N$="A "+X$+","+Y$+" "+P$
13730 PRINT #2,N$;
13740 X1$=X$: Y1$=Y$
13750 GOTO 13600
13760 REM  X$=STR$(5*VAL(X$)-2500): Y$=STR$(5*VAL(Y$)-2250)
13770 GOSUB 17370
13780 IF X2$="" AND Y2$="" THEN X2$=X$: Y2$=Y$: GOTO 13600
13790 GOSUB 15080
13800 GOSUB 15270
13810 N$=XR$+","+YR$+" "
13820 PRINT #2,N$;
13830 X1$=X2$: Y1$=Y2$
13840 X2$=X$: Y2$=Y$
13850 GOTO 13600
13860 P$="U "
13870 GOSUB 15270
13880 N$=XR$+","+YR$+" U "
13890 PRINT #2,N$;
13900 X1$="": Y1$="": X2$="": Y2$=""
13910 GOTO 13600
13920 LOCATE 10,12: PRINT "ALL DATA PROCESSED"
13930 XMIN$=STR$(XMIN): XMAX$=STR$(XMAX)
13940 YMIN$=STR$(YMIN): YMAX$=STR$(YMAX)
13950 CLOSE #2,#3
13970 RETURN
13980 REM  ***********************************************************************
13990 REM   SUBROUTINE TO INPUT SIGNATURE DATA                       FOR GTCO
14010 OPEN WRKDRV$+"SIGDATA.RAW" FOR OUTPUT AS #3      'OPEN RAW DATA FILE AS 3
14015 ON DIGITIZER GOSUB 10600,10800
14030 DELAYLEN=BEEPWAIT: GOSUB 5000
14050 BEEP
14052 CLS
14053 LOCATE 7,17: PRINT "START"
14054 LOCATE 10,13: PRINT "ENTER SIGNATURE"
14056 LOCATE 12,7: PRINT "REMOVE PEN FROM WRITING PAD"
14058 LOCATE 14,14: PRINT "WAIT FOR MENU"
14060 I=0      'INITIALIZE END OF DATA TIMEOUT LOOP
14070 I=I+1    'INCREMENT COUNTER
14080 IF I>DATWAIT GOTO 14180    'IF I>7000 GOTO 14180     'CHECK FOR TIMEOUT
14090 IF EOF(1) THEN 14070    'IF NO INPUT CONTINUE TIMING
14100 A$=INPUT$(LOC(1),#1)    'INPUT DATA
14110 PRINT #3,A$;    'SAVE DATA
14120 CLS
14130 LOCATE 10,13: PRINT "ENTER SIGNATURE"
14140 LOCATE 12,7: PRINT "REMOVE PEN FROM WRITING PAD"
14150 LOCATE 14,14: PRINT "WAIT FOR MENU"
14160 I=0    'RESET TIMEOUT LOOP
14170 GOTO 14090    'GO BACK TO GET MORE DATA
14180 ON DIGITIZER GOSUB 10700,10900
14195 DELAYLEN=ENDWAIT: GOSUB 5000
14200 CLOSE #3
14210 RETURN
14220 REM  ***********************************************************************
14230 REM   SUBROUTINE TO PLOT
14240 OPEN "COM2:9600,N,7,2,CS20000" AS #2    'OPEN COM PORT AS FILE 2
14280 A$=";: A EC1 U "+OFFSET$+" O "     'INITIALIZE PLOTTER, MOVE TO START LOCA
TION, SET NEW ORIGIN
14290 PRINT #2,A$;
14300 OPEN SIGFILE$ FOR INPUT AS #3    'OPEN SIGNATURE FILE AS 3
14310 FILLEN=LOF(3)-1    'GET LENGTH OF FILE
14320 IF FILLEN<255 GOTO 14370    'CHECK FOR FULL BLOCK REMAINING
14330 A$=INPUT$(254,#3)    'INPUT FULL BLOCK
14340 FILLEN=FILLEN-254    'DECREASE REMAINING LENGTH
14350 PRINT #2,A$;    'SEND DATA TO PLOTTER
14360 GOTO 14320    'GO BACK FOR MORE DATA
14370 A$=INPUT$(FILLEN,#3)    'INPUT FINAL BLOCK
14380 PRINT #2,A$;    'SEND DATA TO PLOTTER
14390 PRINT #2," H F-"+PLOTEJEC$+" @ ";    'RETURN PLOTTER TO LOAD POSITION AND
 DESELECT
14430 CLOSE #2, #3
14440 RETURN
14590 REM  ***********************************************************************
14600 REM   SUBROUTINE TO PROCESS SIGNATURE DATA FOR GTCO
14603 CLS
```

```
14606 LOCATE 10,14: PRINT "PROCESSING DATA"
14610 OPEN WRKDRV$+"SIGDATA.RAW" FOR INPUT AS #3
14620 OPEN WRKDRV$+"SIGDATA.PRO" FOR OUTPUT AS #2
14625 GOOD=TRUE
14630 P$="U "
14640 X1$="": X2$="": Y1$="": Y2$=""
14650 XMIN=0: XMAX=0: YMIN=0: YMAX=0
14680 IF EOF(3) THEN 15010
14690 A$=INPUT$(13,#3)
14700 X$=MID$(A$,3,4): Y$=MID$(A$,9,4): C$=MID$(A$,1,1)
14710 IF P$="U " AND C$="0" THEN 14680
14720 IF P$="U " AND C$="1" THEN 14770
14730 IF P$="R D " AND C$="1" THEN 14840
14740 IF P$="R D " AND C$="0" THEN 14940
14750 PRINT "PEN UP/DOWN ERROR AT X$= ";X$;" AND Y$= ";Y$;" WITH C$= ";C$;" AND P$= ";P$
14755 GOOD=FALSE
14760 GOTO 15040
14770 P$="R D "
14780 X$=STR$(VAL(X$)-2500): Y$=STR$(VAL(Y$)-2250)
14785 GOSUB 16140
14790 GOSUB 17370
14800 N$="A "+X$+","+Y$+" "+P$
14810 PRINT #2,N$;
14820 X1$=X$: Y1$=Y$
14830 GOTO 14680
14840 X$=STR$(VAL(X$)-2500): Y$=STR$(VAL(Y$)-2250)
14850 GOSUB 17370
14860 IF X2$="" AND Y2$="" THEN X2$=X$: Y2$=Y$: GOTO 14680
14870 GOSUB 15080
14880 GOSUB 15270
14890 N$=XR$+","+YR$+" "
14900 PRINT #2,N$;
14910 X1$=X2$: Y1$=Y2$
14920 X2$=X$: Y2$=Y$
14930 GOTO 14680
14940 P$="U "
14950 GOSUB 15270
14960 N$=XR$+","+YR$+" U "
14970 PRINT #2,N$;
14980 X1$="": Y1$="": X2$="": Y2$=""
14990 GOTO 14680
15010 LOCATE 10,12: PRINT "ALL DATA PROCESSED"
15020 XMIN$=STR$(XMIN): XMAX$=STR$(XMAX)
15030 YMIN$=STR$(YMIN): YMAX$=STR$(YMAX)
15040 CLOSE #2,#3
15060 RETURN
15070 REM ****************************************************************
15080 REM  SUBROUTINE TO CORRECT FOR EXCESSIVE DEVIATION
15120 X1=VAL(X1$): Y1=VAL(Y1$)
15130 X2=VAL(X2$): Y2=VAL(Y2$)
15140 X=VAL(X$): Y=VAL(Y$)
15150 DELX=X-X1: DELY=Y-Y1
15160 IF DELX=0 THEN X0=X1: Y0=.5*(Y1+Y): GOTO 15220
15170 IF DELY=0 THEN Y0=Y1: X0=.5*(X1+X): GOTO 15220
15180 SLOPE=DELY/DELX
15190 NORMAL=DELX/DELY
15200 X0=(Y2-Y1+SLOPE*X1+X2*NORMAL)/(SLOPE+NORMAL)
15210 Y0=SLOPE*X0+Y1-SLOPE*X1
15220 DEV2=(X2-X0)^2+(Y2-Y0)^2
15230 IF DEV2<ALLOW2 THEN RETURN
15240 X2=CINT(.5*(X1+X)): Y2=CINT(.5*(Y1+Y))
15250 X2$=STR$(X2): Y2$=STR$(Y2)
15260 RETURN
15270 REM ****************************************************************
15280 REM  SUBROUTINE TO MAKE DATA RELATIVE AND REMOVE EXCESS SPACES
15290 XR=VAL(X2$)-VAL(X1$): YR=VAL(Y2$)-VAL(Y1$)
15300 IF XR>=0 GOTO 15320
15310 XR$=STR$(XR): GOTO 15330
15320 XR$=MID$(STR$(XR),2,LEN(STR$(XR))-1)
15330 IF YR>=0 GOTO 15350
15340 YR$=STR$(YR): GOTO 15360
15350 YR$=MID$(STR$(YR),2,LEN(STR$(YR))-1)
15360 RETURN
```

```
15370 REM   ***********************************************************************
15380 REM   SUBROUTINE TO UPDATE NUMBER OF SIGNATURES
15390 OPEN SIGUSER$ AS #2 LEN=40
15400 FIELD #2,8 AS PW$,4 AS NU$,10 AS CRDT$,18 AS CRTM$
15410 FIELD #2,10 AS OPDT$,8 AS OPTM$,10 AS CLDT$,8 AS CLTM$,4 AS NS$
15420 GET #2,1
15430 NU=VAL(NU$)
15440 GET #2,NU+2
15450 NS=VAL(NS$)+1
15460 LSET NS$=RIGHT$(STR$(NS),LEN(STR$(NS))-1)
15470 PUT #2,NU+2
15480 CLOSE #2
15490 RETURN
15500 REM   ***********************************************************************
15510 REM   SUBROUTINE TO RECORD USER FILE CLOSE TIME
15520 OPEN SIGUSER$ AS #2 LEN=40
15530 FIELD #2,8 AS PW$,4 AS NU$,10 AS CRDT$,18 AS CRTM$
15540 FIELD #2,10 AS OPDT$,8 AS OPTM$,10 AS CLDT$,8 AS CLTM$,4 AS NS$
15550 GET #2,1
15560 NU=VAL(NU$)
15570 GET #2,NU+2
15580 LSET CLDT$=DATE$
15590 LSET CLTM$=TIME$
15600 PUT #2,NU+2
15610 CLOSE #2
15620 RETURN
15630 REM   ***********************************************************************
15640 REM   SUBROUTINE TO DISPLAY USER FILE
15650 OPEN SIGUSER$ AS #2 LEN=40
15660 FIELD #2,8 AS PW$,4 AS NU$,10 AS CRDT$,18 AS CRTM$
15670 FIELD #2,10 AS OPDT$,8 AS OPTM$,10 AS CLDT$,8 AS CLTM$,4 AS NS$
15680 GET #2,1
15690 UTD$=STR$(VAL(NU$)-1): CREATEDATE$=CRDT$: CREATETIME$=LEFT$(CRTM$,5): NU=VAL(NU$)
15700 SIGID$=LEFT$(SIGUSER$,8)
15710 J=0
15720 CLS:LOCATE 3,1
15730 PRINT TAB(9);"SIGNATURE FILE ";SIGID$: PRINT
15740 PRINT TAB(6);"CREATED ON ";CREATEDATE$;" AT ";CREATETIME$: PRINT
15745 PRINT TAB(9);"TOTAL USERS TO DATE ";UTD$: PRINT
15750 PRINT TAB(9);"OPEN";TAB(26);"CLOSE";TAB(36);"USES"
15760 FOR I=1 TO 10
15770 UN=10*J+I
15780 GET #2,UN+2
15790 OPENDATE$=OPDT$: OPENTIME$=LEFT$(OPTM$,5): CLOSEDATE$=CLDT$: CLOSETIME$=LEFT$(CLTM$,5): USES$=NS$
15800 IF UN>NU-1 GOTO 15870
15810 PRINT TAB(2);OPENDATE$;TAB(13);OPENTIME$;TAB(19);CLOSEDATE$;TAB(30);CLOSETIME$;TAB(36);USES$
15820 NEXT I
15830 J=J+1
15835 IF UN=NU-1 GOTO 15870
15840 LOCATE 22,8: PRINT "TOUCH 'YES' FOR NEXT PAGE  ";
15850 GOSUB 5200
15860 GOTO 15720
15870 GET #2,NU+2
15880 LSET CLDT$=DATE$
15890 LSET CLTM$=TIME$
15900 LSET NS$="LOG"
15910 PUT #2,NU+2
15920 CLOSE #2
15930 RETURN
15940 REM   ***********************************************************************
15950 REM   SUBROUTINE TO LOG PASSWORD FAILURE
15960 OPEN SIGUSER$ AS #2 LEN=40
15970 FIELD #2,8 AS PW$,4 AS NU$,10 AS CRDT$,18 AS CRTM$
15980 FIELD #2,10 AS OPDT$,8 AS OPTM$,10 AS CLDT$,8 AS CLTM$,4 AS NS$
15990 GET #2,NU+2
16000 LSET CLDT$=DATE$
16010 LSET CLTM$=TIME$
16020 LSET NS$="SV"
16030 PUT #2,NU+2
16040 CLOSE #2
16050 RETURN
```

```
16060 REM  ************************************************************
16070 REM  SUBROUTINE TO REALIGN DIGITIZER
16080 READS=1
16090 XY$=INPUT$(1,#1)
16100 IF XY$=CHR$(13) THEN RETURN
16110 READS=READS+1
16120 IF READS<14 THEN 16090
16125 CLOSE #1
16127 OPEN "COM1:9600,N,8,2,CS,DS,CD" AS #1      'OPEN COM PORT        GTCO
                                                  FOR DIGITIZER AS FILE 1
16130 RETURN
16140 REM  ************************************************************
16150 REM  SUBROUTINE TO REMOVE EXCESS SPACES
16160 REM  ************************************************************
16170 XI=VAL(X$): YI=VAL(Y$)
16180 IF XI>=0 GOTO 16200
16190 X$=STR$(XI): GOTO 16210
16200 X$=MID$(STR$(XI),2,LEN(STR$(XI))-1)
16210 IF YI>=0 GOTO 16230
16220 Y$=STR$(YI): GOTO 16240
16230 Y$=MID$(STR$(YI),2,LEN(STR$(YI))-1)
16240 RETURN
17220 REM  ************************************************************
17230 REM  SUBROUTINE TO DISPLAY FILE
17240 INPUT "ENTER NAME OF FILE TO DISPLAY: ",DISPFILE$
17250 OPEN DISPFILE$ FOR INPUT AS #3
17260 FILLEN=LOF(3)-1
17270 IF FILLEN<255 GOTO 17320
17280 D$=INPUT$(254,#3)
17290 PRINT D$;
17300 FILLEN=FILLEN-254
17310 GOTO 17270
17320 D$=INPUT$(FILLEN,#3)
17330 PRINT D$
17340 CLOSE #3
17350 STOP
17360 REM  ************************************************************
17370 REM  SUBROUTINE TO KEEP TRACK OF SIGNATURE BOUNDS
17380 X=VAL(X$): Y=VAL(Y$)
17390 IF X<XMIN THEN XMIN=X: GOTO 17410
17400 IF X>XMAX THEN XMAX=X
17410 IF Y<YMIN THEN YMIN=Y: GOTO 17430
17420 IF Y>YMAX THEN YMAX=Y
17430 RETURN
17500 REM  ************************************************************
17520 REM  ************************************************************
17530 OPEN WRKDRV$+"PLOTFILE.DAT" FOR OUTPUT AS #2
17540 PRINT #2,";: A EC1 U F-9620 @ ";     'INITIALIZE PLOTTER, MOVE TO START LO
CATION, SET NEW ORIGIN
17550 A$=";: A EC1 U "+SCOFFSET$+" O "     'INITIALIZE PLOTTER, MOVE TO START LO
CATION, SET NEW ORIGIN
17560 PRINT #2,A$;
17570 OPEN SIGFILE$ FOR INPUT AS #3     'OPEN SIGNATURE FILE AS 3
17580 FILLEN=LOF(3)    'GET LENGTH OF FILE
17590 IF FILLEN<=128 GOTO 17640    'CHECK FOR FULL BLOCK REMAINING
17600 A$=INPUT$(128,#3)    'INPUT FULL BLOCK
17610 FILLEN=FILLEN-128    'DECREASE REMAINING LENGTH
17620 PRINT #2,A$;    'SEND DATA TO PLOTTER
17630 GOTO 17590    'GO BACK FOR MORE DATA
17640 IF EOF(3) THEN GOTO 17660 ELSE A$=INPUT$(1,#3)
17650 PRINT #2,A$;: GOTO 17640    'SEND DATA TO PLOTTER
17660 PRINT #2," H F-"+PLOTEJEC$+" @ ";    'RETURN PLOTTER TO LOAD POSITION AND
 DESELECT
17670 CLOSE #2, #3
17970 REM  ************************************************************
17980 REM  SUBROUTINE TO PLOT ON SCREEN
17990 REM  ************************************************************
18000 OPEN WRKDRV$+"PLOTFILE.DAT" FOR INPUT AS #3
18002 SCREEN 0: COLOR 7,0: WIDTH 80
18004 CLS
18010 XO=0: YO=0
18020 COORD$="A": PN$="U"
18030 RES$="EC1": XCONV=30: YCONV=35: RESFAC=.2
18060 SCREEN 1: COLOR 0,0
```

```
18070 IF EOF(3) GOTO 18200
18080 A$=INPUT$(1,#3)
18090 IF A$=" " OR A$="," OR A$=CHR$(13) GOTO 18070
18100 IF A$=";" THEN GOSUB 18220: GOTO 18070
18110 IF A$="A" OR A$="R" THEN GOSUB 18260: GOTO 18070
18120 IF A$="U" OR A$="D" THEN GOSUB 18290: GOTO 18070
18130 IF A$="O" THEN GOSUB 18320: GOTO 18070
18140 IF A$="E" THEN GOSUB 18350: GOTO 18070
18150 IF A$="H" THEN GOSUB 18440: GOTO 18070
18160 IF A$="F" THEN GOSUB 19780: GOTO 18070
18170 IF A$="@" THEN GOTO 18010
18180 GOSUB 18510
18190 GOTO 18070
18200 CLOSE #3
18205 PRINT "TOUCH 'YES' TO CONTINUE   ";
18206 GOSUB 5200
18207 SCREEN 0: COLOR 7,0
18210 RETURN
18220 REM   SUBROUTINE INITIALIZE
18230 A$=INPUT$(1,#3)
18240 IF A$<>" " GOTO 18230
18250 RETURN
18260 REM   SUBROUTINE COORD
18270 COORD$=A$
18280 RETURN
18290 REM   SUBROUTINE PEN
18300 PN$=A$
18310 RETURN
18320 REM   SUBROUTINE ORIGIN
18330 XO=XABS: YO=YABS
18340 RETURN
18350 REM   SUBROUTINE RESOLUTION
18360 NRS$=A$+INPUT$(2,#3)
18370 IF NRS$=RES$ THEN RETURN
18380 RESFAC=VAL(RIGHT$(NRS$,1))/VAL(RIGHT$(RES$,1))
18390 XO=XO*RESFAC: YO=YO*RESFAC
18400 XABS=XABS*RESFAC: YABS=YABS*RESFAC
18410 XCONV=XCONV*RESFAC: YCONV=YCONV*RESFAC
18420 RES$=NRS$
18430 RETURN
18440 REM   SUBROUTINE HOME
18450 PN$="U"
18460 XO=0: YO=0
18470 XABS=0: YABS=0
18480 GOSUB 18700
18490 GOSUB 18740
18500 RETURN
18510 REM   SUBROUTINE DATA
18520 XDAT$=""
18530 YDAT$=""
18540 XDAT$=XDAT$+A$
18550 A$=INPUT$(1,#3)
18560 IF A$=" " OR A$="," GOTO 18580
18570 GOTO 18540
18580 A$=INPUT$(1,#3)
18590 IF A$=" " OR A$="," GOTO 18620
18600 YDAT$=YDAT$+A$
18610 GOTO 18580
18620 XDAT=VAL(XDAT$)
18630 YDAT=VAL(YDAT$)
18640 IF COORD$="A" THEN XABS=XO: YABS=YO
18650 XABS=XABS+XDAT
18660 YABS=YABS+YDAT
18670 GOSUB 18700
18680 GOSUB 18740
18690 RETURN
18700 REM   SUBROUTINE CONVERT
18710 XS=CINT(XABS/XCONV)
18720 YS=199-CINT(YABS/YCONV)
18730 RETURN
18740 REM   SUBROUTIINE PLOT
18750 IF PN$="U" THEN PSET(XS,YS): GOTO 18770
18760 LINE -(XS,YS)
18770 RETURN
```

```
18780 REM   SUBROUTINE FORM FEED
18790 A$=INPUT$(1,#3)
18800 IF A$<>" " GOTO 18790
18810 RETURN
19000 REM   ***********************************************************
19010 REM   SUBROUTINE TO PRINT COMMANDS OUT TO GTCO DIGITIZER
19020 REM   ***********************************************************
19030 PRINT #1,CHR$(1);
19040 GOSUB 19200
19050 PRINT #1,COMMAND$;
19060 GOSUB 19200
19070 PRINT #1,CHR$(27);
19080 REM   GOSUB 19200
19090 RETURN
19200 FOR I=1 TO 400
19210 NEXT I
19220 A$=INPUT$(LOC(1),#1)
19240 RETURN
```

We claim:

1. A method of duplicating handwriting comprising producing a set of a plurality of serial, mutually adjacent coordinates of points of raw data by moving a cursor through a plurality of locations on a digitizer pad to produce handwriting, said digitizer pad comprising means for detecting said locations and means for generating the coordinates of each location, said coordinates representative of a plurality of representative points which when connected by a line would replicate said cursor movement and thus replicate said handwriting, wherein said cursor can be placed out of proximity of said digitizer's pad, can be placed in proximity, but not touching said digitizer pad, and can touch said digitizer pad, said digitizer pad and cursor producing a signal when said cursor is in contact with said digitizer pad, and wherein said cursor and digitizer pad produce said raw coordinates as data at a predetermined rate irrespective of whether said cursor is in contact with said digitizer pad, and wherein said digitizer pad and cursor provide as indication data a first indication when said cursor is out of proximity of said pad, provide a second indication when said cursor is in proxmity of said pad, but not touching said pad, and provide said signal as a third indication when said cursor is in contact with said pad;

serially storing at a predetermined rate said raw coordinate data and said indication data in a memory means readable by a digital computer;

refining said coordinate point data by compressing said data by deleting all data having either said first indication or said second indication;

serially recalling said plurality of point coordinate data from said memory means; and driving a writing instrument to traverse serially a path from each point coordinates to the next adjacent point coordinate and thus serially over all of said plurality of point coordinates so as to produce a line connecting together each point coordinate and thus replicating said handwriting.

2. Apparatus for duplicating a handwritten word, such as a signature, comprising a digitizer pad;

a cursor having a predetermined origin;

a cursor capable of being moved by a user into and out of proximity to said digitizer pad and through a plurality of locations on said digitizer pad, said digitizer pad said digitizer pad comprising means for producing a set of raw data point coordinates of the location of said cursor when said cursor is in proximity to said pad and for producing an indication signal when said cursor is in contact with said pad, said coordinates being in absolute units from said predetermined origin;

a plotter capable of receiving data and capable of being driven by said received data so as to mark a piece of paper;

a programmable computer connected to said pad to receive as inputs said coordinates and said indication signal, and connected to said plotter to provide data thereto to drive said plotter;

a buffer memory for storing data received by said computer from said pad.

a program memory that stores a computer program for operating said computer; and means for causing the storing of a plurality of raw data point coordinates provided by said digitizer pad in said buffer memory, for causing the compacting of the raw data point coordinates by said computer by deleting those point coordinates having predetermined characteristics causing the refining of said raw data point coordinates by said computer to produce a plurality of refined data points by changing said raw data point coordinates from absolute units to relative units that are a relative distance from another coordinate and for causing the smoothing of the raw date point coordinates, and thus thereby converting the data to a form unable by said plotter.

3. A method of duplicating handwriting comprising:

producing an initial set of a plurality of serial, mutually adjacent coordinates of points of raw data of a handwritten word as the word is being written by moving a cursor through a plurality of locations on a digitizer pad to produce the handwritten word, said digitizer pad comprising means for detecting said locations and means for generating the coordinates of each location, said coordinates representative of a plurality of representative points which when connected by a line would replicate said cursor movement and thus replicate said handwriting, said raw data point coordinates being in absolute units from a predetermined origin;

serially storing said set of raw data point coordinates in a memory means readable by a digital computer;

serially recalling said plurality of refined point coordinates from said memory means;

refining said recalled raw data point coordinates with said computer to produce a plurality of refined data point coordinates by changing said raw data point coordinates from absolute units to relative units that are a relative distance from another coordinate; and driving a writing instrument to traverse serially a path from each refined point coordinates to the next adjacent refined point coordinate and thus serially over all of said plurality of refined point coordinates so as to produce a line connecting together each point coordinate with the point coordinates adjacent thereto and thus repliciting said handwriting.

4. The method as claimed in claim 3 wherein said refining step initially comprises determining new coordinates for those raw data points that are outside a predetermined locus thereby producing a smoothened handwriting word by said driving step.

5. The method as claimed in claim 3 wherein said raw coordinates are produced by a digitizer pad and cursor at a predetermined rate irrespective of whether said cursor is in contact with said digitizer pad, said digitizer pad also providing a first indicator when said cursor is out of proximity of said pad, providing a second indication when said cursor is in proximity of said pad, and providing a third indication when said cursor is in contact with said pad;

and further comprising having said computer send a start signal to said digitizer pads and thereupon commence receiving data from said digitizer pad at said predetermined rate;

and wherein said refining step includes compressing said received data by deleting all data received from said digitizer pad having said first indication and all data received from said digitizer pad having said second indication.

6. The method as claimed in claim 3 and further including:
. determining the point coordinates of a starting location for said handwriting on a piece of paper; and
directing said writing instrument to begin replicating said handwriting on said paper at said starting location.

7. The method as claimed in claim 6 wherein said writing instrument comprises a plotter having a writing implement; and said method further comprising using said computer to provide said refined point coordinates to said plotter.

8. The method as claimed in claim 7 and further comprising assigning a password to said stored coordinates; and
prior to said step of using said computer to provide said refined coordinates to said plotter, requiring a user to provide said password on a computer input means to said computer, and having said computer verify if said password corresponds to said assigned password.

9. The method as claimed in claim 3 wherein said writing instrument comprises a plotter having a writing implement; and said method further comprising using said computer to provide said refined data point coordinates to said plotter;
and further including providing a piece of paper to said plotter; and
directing said plotter to replicate said handwriting on said paper.

* * * * *